(12) United States Patent
Hamada et al.

(10) Patent No.: US 8,590,775 B2
(45) Date of Patent: Nov. 26, 2013

(54) IMAGE PROCESSING APPARATUS, IMAGE PROCESSING METHOD, AND COMPUTER READABLE STORAGE MEDIUM

(75) Inventors: Yuuta Hamada, Tokyo (JP); Takahiro Asai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 752 days.

(21) Appl. No.: 12/830,659

(22) Filed: Jul. 6, 2010

(65) Prior Publication Data

US 2011/0026081 A1    Feb. 3, 2011

(30) Foreign Application Priority Data

Jul. 30, 2009   (JP) .................................. 2009-178308
Feb. 26, 2010  (JP) .................................. 2010-043377

(51) Int. Cl.
*G06F 17/00* (2006.01)

(52) U.S. Cl.
USPC ............................ 235/375; 235/454; 235/494

(58) Field of Classification Search
USPC ........... 235/375, 454, 494; 358/3.28, 2.1, 1.9, 358/3.24, 1.18
See application file for complete search history.

(56) References Cited

U.S. PATENT DOCUMENTS

| 7,149,000 B1* | 12/2006 | Sakai et al. ................... 358/3.28 |
| 2003/0131237 A1 | 7/2003 | Ameline et al. |
| 2005/0109846 A1 | 5/2005 | Lubow |
| 2006/0078159 A1 | 4/2006 | Hamatake et al. |
| 2007/0025625 A1 | 2/2007 | Burian et al. |
| 2007/0258588 A1* | 11/2007 | Ogata ............................ 380/201 |
| 2008/0089552 A1* | 4/2008 | Nakamura et al. ............. 382/100 |
| 2008/0158613 A1* | 7/2008 | Suzuki et al. ................. 358/3.28 |
| 2009/0028381 A1 | 1/2009 | Aoyagi |
| 2009/0303544 A1* | 12/2009 | Kido ............................ 358/1.18 |
| 2009/0323127 A1* | 12/2009 | Oosawa ........................ 358/401 |

FOREIGN PATENT DOCUMENTS

| CN | 101044662 A | 9/2007 |
| CN | 101228550 A | 7/2008 |
| EP | 1 085 464 A2 | 3/2001 |
| EP | 1 085 464 A3 | 3/2001 |
| JP | 2008-131420 | 6/2008 |
| JP | 2010-57058 | 3/2010 |
| WO | WO 2006/023807 A2 | 3/2006 |
| WO | WO 2006/023807 A3 | 3/2006 |
| WO | WO 2007/012986 A1 | 2/2007 |

OTHER PUBLICATIONS

Office Action issued Jul. 4, 2012 in Chinese Application No. 201010242401.X (With English Translation).
Extended European Search Report issued Nov. 30, 2010 in EP 10 16 9480.

* cited by examiner

*Primary Examiner* — Edwyn Labaze
(74) *Attorney, Agent, or Firm* — Oblon, Spivak, McClelland, Maier & Neustadt, L.L.P.

(57) ABSTRACT

An image processing apparatus includes a generating unit and a superimposing unit. The generating unit generates an image carrier representing a machine-readable image pattern by using information to be embedded into a first image. The superimposing unit makes a second image translucent, the second image being an image of the image carrier, and superimposes the second image onto the first image in such a manner that the second image can be mechanically read and the first image can be read by a user.

17 Claims, 27 Drawing Sheets

| DRAWING COMMAND 1 |
| ACCOMPANYING DATA 1 |
| DRAWING COMMAND 2 |
| ACCOMPANYING DATA 2 |
| DRAWING COMMAND 3 |
| ACCOMPANYING DATA 3 |
| ..... |

| DRAWING COMMAND | ACCOMPANYING DATA |
|---|---|
| CHARACTER STRING | CHARACTER STRING, POSITION, SIZE, COLOR |
| GRAPHICS | GRAPHIC DATA, POSITION, SIZE |
| VECTOR | VECTOR DATA, POSITION, COLOR |

FIG. 13

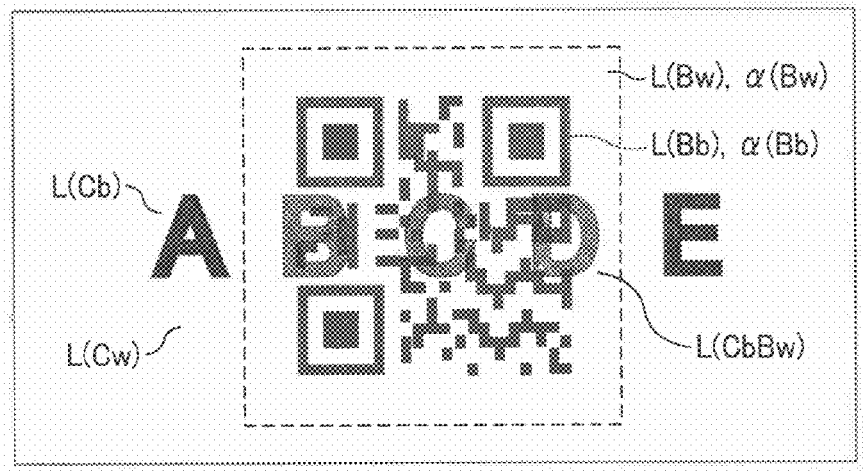

L(Bb) : BRIGHTNESS OF BLACK BACKGROUND PORTION OF BARCODE
(IN THIS EXAMPLE, 0)
L(Bw) : BRIGHTNESS OF WHITE BACKGROUND PORTION OF BARCODE
(IN THIS EXAMPLE, 255)
L(Cb) : BRIGHTNESS OF BLACK BACKGROUND PORTION OF DOCUMENT IMAGE
(IN THIS EXAMPLE, 0)
L(Cw) : BRIGHTNESS OF WHITE BACKGROUND PORTION OF DOCUMENT IMAGE
(IN THIS EXAMPLE, 255)

$\alpha$(Bb) : TRANSPARENCY OF BLACK BACKGROUND PORTION OF BARCODE
$\alpha$(Bw) : TRANSPARENCY OF WHITE BACKGROUND PORTION OF BARCODE
L(Bb/Cw) : BRIGHTNESS OF BLACK BACKGROUND PORTION ARRANGED IN
WHITE BACKGROUND PORTION OF DOCUMENT IMAGE (=$\alpha$(Bb))
L(Cb/Bw) : BRIGHTNESS OF BLACK BACKGROUND PORTION OF DOCUMENT
IMAGE OVERLAPPING WHITE BACKGROUND PORTION OF BARCODE
(=255-$\alpha$(Bw))

∴ CONDITION THAT BLACK BACKGROUND PORTION OF BARCODE AND
BLACK BACKGROUND PORTION OF CONTENTS OF DOCUMENT CAN BE
SEPARATED FROM EACH OTHER :
L(Bb/Cw)<L(Cb/Bw) ⇒ $\alpha$(Bb)<255-$\alpha$(Bw) ⇒ $\alpha$(Bb)+$\alpha$(Bw)<255

BEFORE
APPLICATION

AFTER
APPLICATION

IMAGE PROCESSING APPARATUS, IMAGE PROCESSING METHOD, AND COMPUTER READABLE STORAGE MEDIUM

CROSS-REFERENCE TO RELATED APPLICATIONS

The present application claims priority to and incorporates by reference the entire contents of Japanese Patent Application No. 2009-178308 filed in Japan on Jul. 30, 2009 and Japanese Patent Application No. 2010-043377 filed in Japan on Feb. 26, 2010.

BACKGROUND OF THE INVENTION

1. Field of the Invention

The present invention relates to an image processing apparatus, an image processing method, and a computer readable storage medium having stored therein an image processing program.

2. Description of the Related Art

Digital watermarking, for example, has been known as a technology for ensuring the security of a document printed on a paper. Digital watermarking is a technology for embedding confidential information and the like into an image There are various types of digital watermarking, such as, a technology for superimposing a dot pattern converted from confidential information onto a background of an image (document image) representing a document so that the confidential information can be embedded into the document image, and a technology for forming a void (cut) and a spot (dot) on an edge portion (e.g., a character portion) in the document image or finely shifting a space between characters in the document image so that the confidential information can be embedded into the document image (contents processing technology). However, the conventional digital watermarking has a problem in that the confidential information may not appropriately be embedded depending on a document. For example, in the method of embedding the dot pattern into the background of a document image, when the document image contains a number of character regions, diagram regions, and photograph regions or when the background of the document image is colored, it may be difficult to embed the dot pattern into the document image or to read the confidential information from the dot pattern. Furthermore, in the method using the contents processing technology, when the document image contains only a small number of character regions and diagram regions or when the document image contains a number of photograph regions (gradation images), because the numbers of character portions and edge portions are small, it may be difficult to embed the confidential information into the document image. On the other hand, Japanese Patent Application Laid-open No. 2008-131420 discloses a technology in which, when the confidential information cannot be embedded into the document image by the digital watermarking because the document image contains a number of character regions, a barcode encoded from the confidential information is superimposed onto a specific region, such as a region containing a small number of characters, in the document image so that the confidential information can be embedded into the document image.

However, in the technology disclosed in Japanese Patent Application Laid-open No. 2008-131420, when the document image contains a large number of character regions such that it contains virtually no region having a small number of characters, a user may not be able to read the contents of the document image because of the superimposition of the barcode. Therefore, the original function of the document image may be lost. Thus, it is difficult to solve the problem that the confidential information cannot appropriately be embedded depending on a document. Furthermore, in the technology disclosed in Japanese Patent Application Laid-open No. 2008-131420, the barcode is embedded into a region containing a small number of characters, i.e., a region considered to be less important in the document image. Therefore, when the barcode is blacked out or cut out, the confidential information can easily be invalidated. Thus, it is difficult to ensure the security.

SUMMARY OF THE INVENTION

It is an object of the present invention to at least partially solve the problems in the conventional technology.

According to one aspect of the present invention, an image processing apparatus includes: a generating unit that generates an image carrier representing a machine-readable image pattern by using information to be embedded into a first image; and a superimposing unit that makes a second image translucent, the second image being an image of the image carrier, and superimposes the second image onto the first image in such a manner that the second image can be mechanically read and the first image can be read by a user.

According to another aspect of the present invention, an image processing method implemented by an image processing apparatus including a generating unit and a superimposing unit, the image processing method includes: generating, by the generating unit, an image carrier representing a machine-readable image pattern by using information to be embedded into a first image; making, by the superimposing unit, a second image being an image of the image carrier translucent; and superimposing, by the superimposing unit, the second image being made translucent onto the first image in such a manner that the second image can be mechanically read and the first image can be read by a user.

According to still another aspect of the present invention, a computer readable storage medium having stored therein an image processing program, the image processing program causing a computer as an image processing apparatus including a generating unit and a superimposing unit to execute a process including: generating, by the generating unit, an image carrier representing a machine-readable image pattern by using information to be embedded into a first image; making, by the superimposing unit, a second image being an image of the image carrier translucent; and superimposing, by the superimposing unit, the second image being made translucent onto the first image in such a manner that the second image can be mechanically read and the first image can be read by a user.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a diagram for explaining a desirable transparency for making a barcode translucent;

DETAILED DESCRIPTION OF THE PREFERRED EMBODIMENTS

Figure 1:
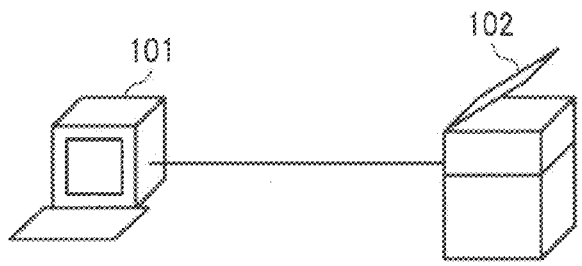
FIG. 1 is a diagram illustrating a configuration of a whole image processing system according to a first embodiment.

Exemplary embodiments of an image processing apparatus, an image processing method, and a computer readable storage medium having stored therein an image processing program according to the present invention are explained in detail below with reference to the accompanying drawings. FIG. 1 is a diagram illustrating a configuration of an overall image processing system according to a first embodiment of the present invention. As illustrated in FIG. 1, the image processing system includes a personal computer 101 and a multifunction peripheral (MFP) 102, which are image processing apparatuses connected to each other via a connection mechanism. Examples of the connection mechanism include a network such as a LAN (Local Area Network) and a connection line such as a USB (Universal Serial Bus). The personal computer 101 transmits print data to the MFP 102 according to a print instruction from a user, and the MFP 102 prints an image on a print medium by using the print data. Furthermore, the MFP 102 reads an image appearing on a print medium set thereon and generates image data of the image, and the personal computer 101 acquires the image data. In FIG. 1, an example is illustrated in which the personal computer 101 and the MFP 102 are connected one-to-one; however, when they are connected via a network, many-to-many connection may be applied.

Figure 2:
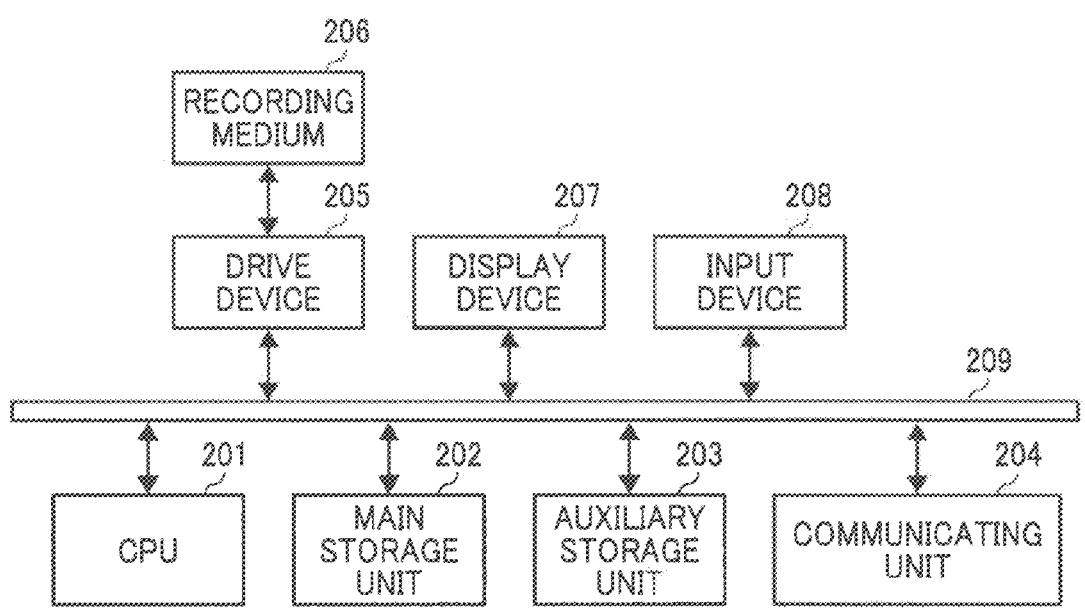
FIG. 2 is a diagram illustrating a hardware configuration of a personal computer.

Next, a hardware configuration of the personal computer 101 is explained with reference to FIG. 2. The personal computer 101 has a configuration of a general computer including a CPU (Central Processing Unit) 201 that controls the personal computer 101 as a whole, a main storage unit 202 such as a ROM (Read Only Memory) and a RAM (Random Access Memory) for storing various control programs and various data, an auxiliary storage unit 203 such as a HDD (Hard Disk Drive) for storing various application programs and various data, a communicating unit 204 that controls data communication with external apparatuses, a drive device 205, and a bus 209 that connects the above units to one another. The drive device 205 may be configured to drive a recording medium 206 inserted therein. Furthermore, a display device 207 such as a monitor and an input device 208 such as a mouse and a keyboard are connected to the personal computer 101 via a wired or a wireless connection mechanism. A printer driver to be described later is stored in the storage units of the personal computer 101. In this hardware configuration, the personal computer 101 implements functions of embedding a barcode into an image and mechanically reading a barcode from an image. A functional configuration for implementing these functions will be described later.

Figure 3:
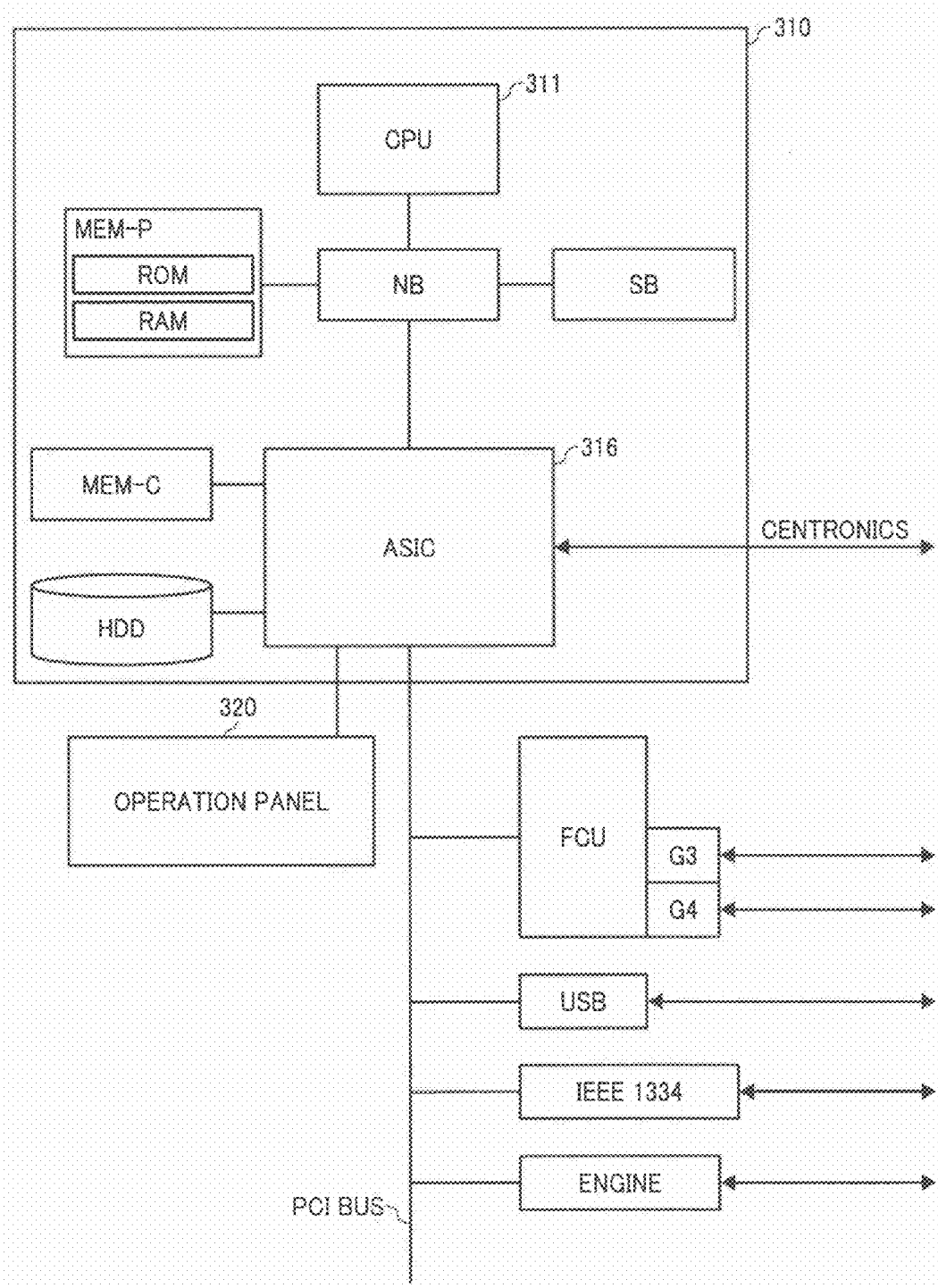
FIG. 3 is a diagram illustrating a hardware configuration of a multifunction peripheral.

Next, a hardware configuration of the MFP 102 is explained with reference to FIG. 3. As illustrated in FIG. 3, the MFP 102 includes a controller 310 and an engine unit (Engine) 360, which are connected to each other via a PCI (Peripheral Component Interconnect) bus. The controller 310 controls the whole MFP 102, drawing, communication, and inputs from an operating unit not illustrated. The engine unit 360 is a printer engine and the like connectable to the PCI bus, and includes a scanning unit such as a scanner and a printing unit such as a monochrome plotter, a one-drum color plotter, or a four-drum color plotter (which are not illustrated). The engine unit 360 includes an image printing section for error diffusion, gamma conversion, and the like, as well as a so-called engine section such as a plotter. The MFP 102 further includes an image reading unit such as a scanner for scanning a paper to read an image. The MFP 102 still further includes an operation panel 320 in which an operating device that receives input of operations from a user and a display device that displays information are integrated with each other. The operation panel 320 is connected to an ASIC 316. A CPU 311 included in the controller 310 has a timer function to count time for the current time and date. A detailed configuration that can be applied to the MFP 102 is disclosed in, for example, Japanese Patent Application Laid-open No. 2006-177990, and therefore, explanation thereof is omitted.

Figure 4:
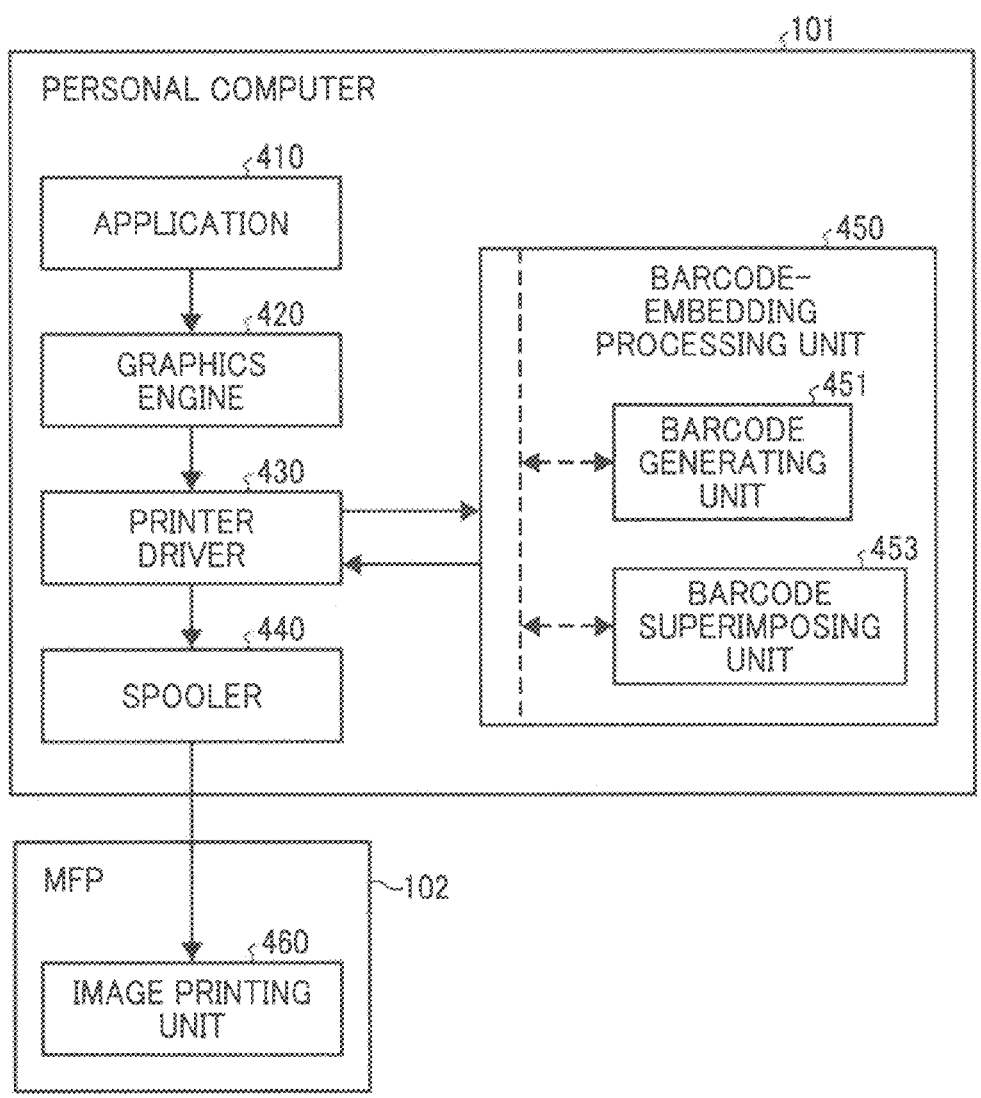
FIG. 4 is a diagram illustrating a functional configuration related to a printing process in the image processing system.

Next, a functional configuration related to a printing process in the image processing system is explained with reference to FIG. 4. As illustrated in FIG. 4, the personal computer 101 includes, as functions related to operations and print control on document data and the like, an application 410, a graphics engine 420, a printer driver 430, a spooler 440, and a barcode-embedding processing unit 450. The substance of the above components is various computer programs such as modules stored in the main storage unit 202 and the auxiliary storage unit 203, and functions of the above components are implemented by executing the computer programs by the CPU 201. The MFP 102 includes an image printing unit 460.

The application 410 is a general application such as word-processing software and spreadsheet software used for generating information to be printed by the MFP 102, e.g., for generating an electronic document that represents a document as electronic data. In the first embodiment, an image of an electronic document is handled as one of document images representing documents. The documents may contain diagrams such as graphs, and photographs in addition to characters and numerals. The application 410 generates information, such as confidential information, to be embedded into a document image and to be converted to a barcode (referred to as additional information). The graphics engine 420 is a module that provides a function interface, which is used for drawing and eliminates differences between devices such as MFPs, printers, and displays. The graphics engine 420 is a module that converts an electronic document in a print range into data in an application independent format (e.g., data in EMF (Enhanced Meta File) format; hereinafter, referred to as "drawing data") according to a function call by the application 410, and outputs the generated drawing data to the printer driver 430. The graphics engine 420 is provided by OS (Operating System). For example, in the WINDOWS (registered trademark) environment, a GDI (Graphics Device Interface) functions as the graphics engine 420.

Figures 5A, 5B, 6:
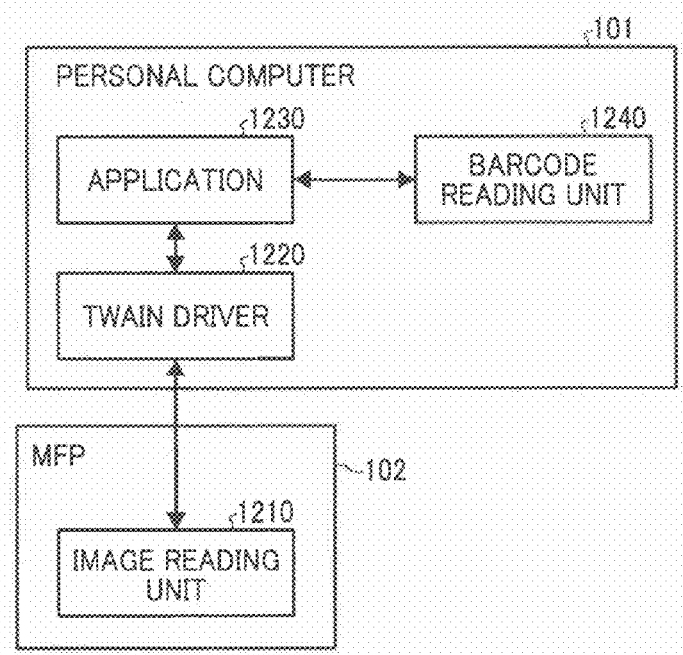
FIGS. 5A and 5B are diagrams illustrating a data structure of drawing data in EMF format.
FIG. 6 is a diagram illustrating a functional configuration related to a barcode reading process in the image processing system.

FIGS. 5A and 5B are diagrams illustrating an example of a data structure of drawing data in EMF format. As illustrated in FIG. 5A, the drawing data in EMF format and the like is formed of a series of drawing commands and pieces of accompanying data corresponding to the respective drawing commands. As illustrated in FIG. 5B, the drawing commands are provided for a "character string", "graphics (image)", "vector", and the like. Examples of the accompanying data corresponding to the drawing command for a character string include a "character string", a "position", a "size", and a "color". Examples of the accompanying data corresponding to the drawing command for graphics include "graphic data", a "position", and a "size". Examples of the accompanying data corresponding to the drawing command for vector include "vector data", a "position", and a "color". In case of the drawing command for a "character string", the size represents a character size. As for the character size, a plurality of different sizes may be provided. In case of the drawing commands for "graphics (image)" and "vector", the "size" represents a size of an image containing at least one of a diagram and a photograph, and is corresponding to an area of the image. The drawing command for a character string corresponds to a text region in which a character string appears. The drawing command for graphics corresponds to a graphic region in which an image containing at least one of a diagram and a photograph appears. The drawing command for vector corresponds to a graphic region in which an image in vector format appears.

Referring back to FIG. 4, the printer driver 430 converts the drawing data output by the graphics engine 420 into data (hereinafter, referred to as "print data") in a format that an MFP and a printer corresponding to the printer driver 430 can interpret and process (e.g. PDL (Page Description Language)). In the process of converting the drawing data into the print data, the printer driver 430 of the first embodiment sends the drawing data and a barcode generation parameter for generating a barcode to the barcode-embedding processing unit 450, acquires drawing data onto which an image of the barcode (barcode image) is superimposed by the barcode-embedding processing unit 450, and converts the drawing data into the print data. The barcode is an information carrier representing a machine-readable geometric image pattern. Examples of the barcode include a one-dimensional barcode and a two-dimensional code. As for a barcode type, Code 39, EAN-8, EAN-13, Codabar (NW-7), Code 128, and the like are known as the one-dimensional barcode, and, PDF417 as a two-dimensional stacked code, QR and DataMatrix as a two-dimensional matrix code, and the like are known as the two-dimensional code. Each type has own predetermined rule, and a barcode of each type is generated by performing encoding according to the predetermined rule for each type. The barcode generation parameter contains, for example, a barcode type, additional information such as a character string and confidential information specified as an object to be converted to a barcode, and a size of a barcode module (referred to as a module size). The barcode module is a minimum-unit component constituting the barcode. More specifically, the barcode module corresponds to the thinnest line in the one-dimensional barcode and a cell in the two-dimensional code.

The spooler 440 is a module for storing a print job to allow sequential printing. The spooler 440 receives the print data from the printer driver 430, and sends the print data to the MFP 102. In general, because speed of generating the print data by the printer driver 430 is faster than speed of sending the print data to the MFP 102, the print data is temporarily stored in the spooler 440. The spooler 440 deletes the print data after completion of sending all the print data.

The barcode-embedding processing unit 450 is used for implementing the function of embedding a barcode into an image, and configured to receive the drawing data and the barcode generation parameter from the printer driver 430, generate a barcode, and generate drawing data to which the barcode is added. The barcode-embedding processing unit 450 includes a barcode generating unit 451 and a barcode superimposing unit 453 for dividing the above function. The barcode generating unit 451 is a module that generates a barcode by encoding the additional information according to a predetermined rule by using the barcode generation parameter. In other words, the additional information is converted to a barcode by the barcode generating unit 451. As for the encoding to the barcode, a large number of techniques and products have been known and proposed, and any of them can be used in the first embodiment. The barcode superimposing unit 453 is a module that receives the drawing data and the barcode, superimposes a barcode image onto an image of the drawing data to generate drawing data to which the barcode is added, and sends the drawing data to the printer driver 430. In the first embodiment, the barcode superimposing unit 453 makes the barcode image translucent and superimposes the barcode image onto the image of the drawing data. Details about making the barcode image translucent and superimposing the barcode image onto the image will be described later along with explanation of operations.

The image printing unit 460 is a module that receives the print data from the spooler 440 of the personal computer 101 and performs a printing process by using the print data.

Next, a functional configuration related to a barcode reading process in the image processing system is explained with reference to FIG. 6. As illustrated in FIG. 6, the MFP 102 includes an image reading unit 1210 as a function related to a control of reading a barcode. The personal computer 101 includes a TWAIN driver 1220, an application 1230, and a barcode reading unit 1240. The substance of these components is various computer programs such as modules stored in the main storage unit 202 and the auxiliary storage unit 203, and functions of the above components are implemented by executing the computer programs by the CPU 201.

The image reading unit 1210 is a module that reads an image, such as a document, appearing on a print medium set on the MFP 102, and generates image data of the image. The TWAIN driver 1220 is a module that directly accesses the MFP 102 to acquire the image data, and sends the image data to the application 1230. This function is the same as the function that an existing TWAIN driver has, and any TWAIN drivers can be used in the first embodiment. The application 1230 receives the image data from the TWAIN driver 1220, sends the image data to the barcode reading unit 1240, and receives from the barcode reading unit 1240 additional information that has been embedded as the barcode in the image. The barcode reading unit 1240 is used for implementing the function of reading a barcode from an image, and is a module that receives the image data from the application 1230, mechanically reads an image of the barcode added to the image data to thereby recognize the barcode (recognition of a barcode image), decodes the barcode according to a predetermined rule to thereby acquire the additional information that has been converted to the barcode and embedded into the image, and returns the additional information as a recognition result to the application 1230. As for a process of recognizing the barcode image and decoding the barcode, a large number of techniques and products have been known and proposed, and any of them can be used in the first embodiment.

Figure 8:
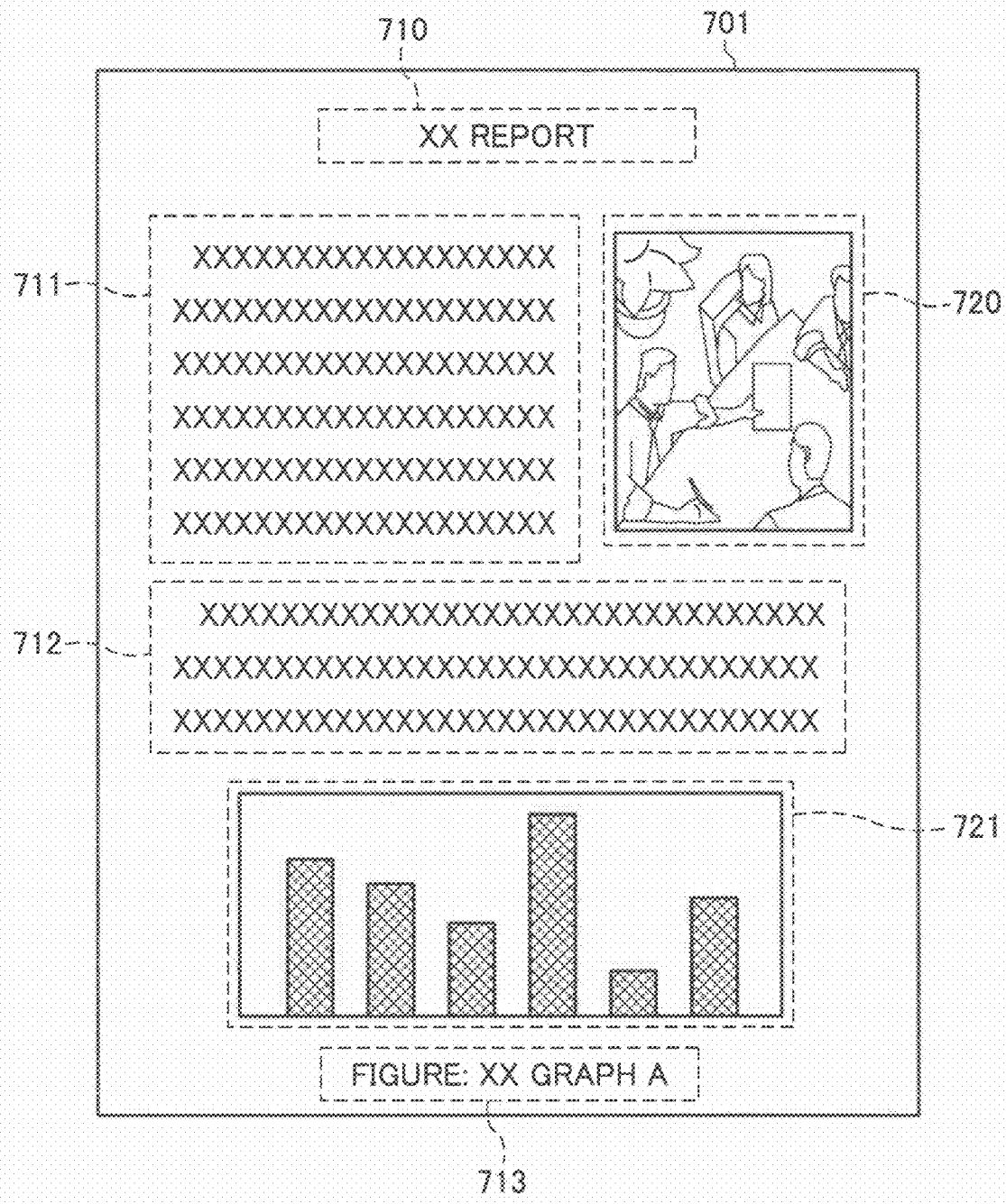
FIG. 8 is a diagram illustrating an electronic document representing a document image.
Figure 9:
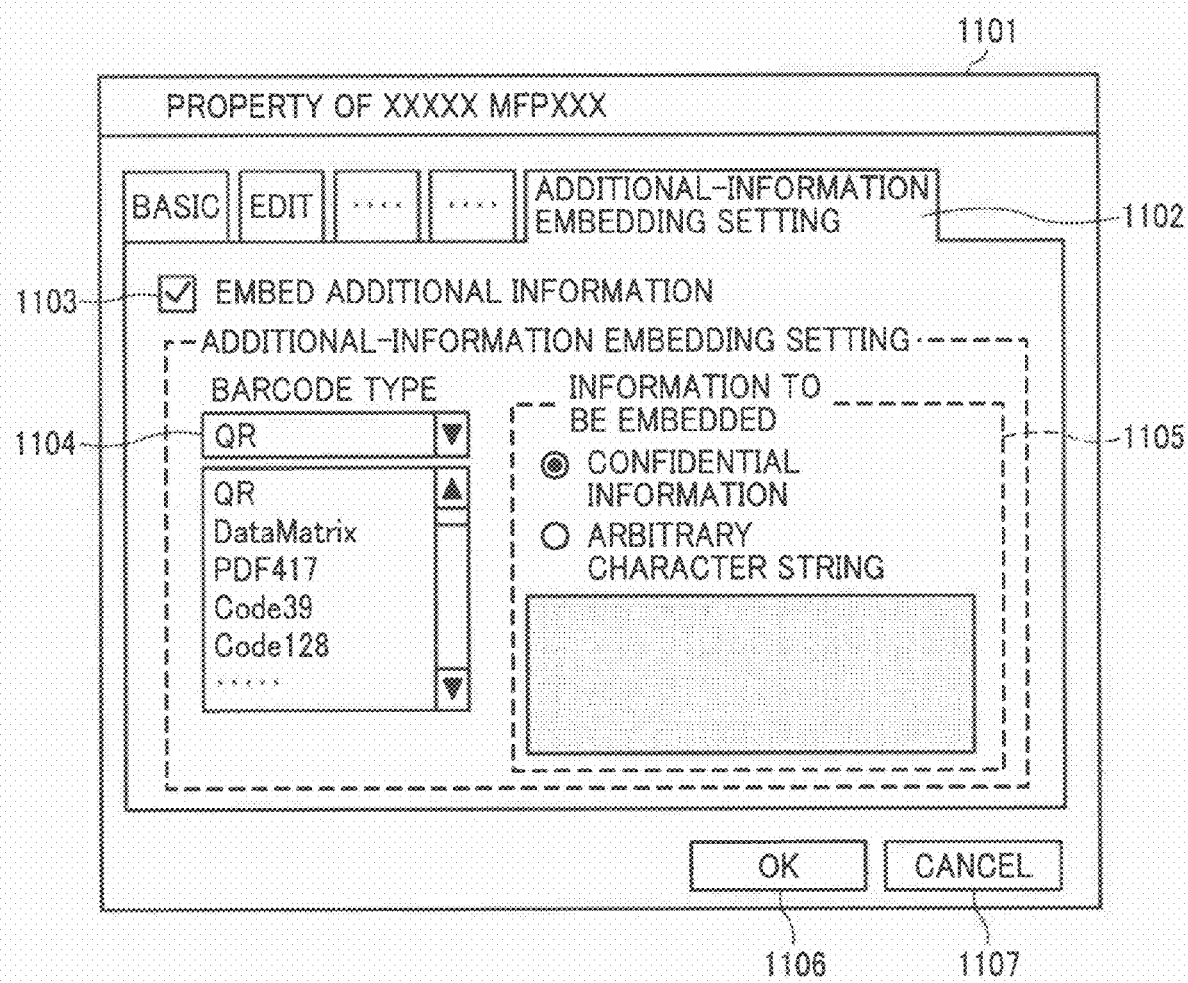
FIG. 9 is a diagram illustrating a print setting dialogue.

Next, a procedure of a printing process performed by the image processing system according to the first embodiment is explained with reference to FIG. 7. The application 410 of the personal computer 101 generates an electronic document 701 representing a document image as illustrated in FIG. 8 (Step S1). The electronic document 701 contains text regions 710 to 713 and graphic regions 720 and 721. Then, the application 410 displays on the display device 207 a print menu as a user interface for printing the electronic document. When a user selects the MFP 102 as a print destination from the print menu, the application 410 displays a print setting dialogue 1101 as illustrated in FIG. 9 on the display device 207 (Step S2). The print setting dialogue 1101 contains an additional-information embedding setting tab 1102 as a part of print conditions. In this tab, a check box 1103 for selecting whether to embed additional information, a combo box 1104 for setting a type of a barcode to be embedded, and a group box 1105 for specifying additional information are contained. As for the additional information, arbitrary character strings or confidential information can be specified. The confidential information is assumed to be information for identifying the origin of a document (e.g., a print time and date, a person who has printed the document, and a model number of a printing apparatus). The print setting dialogue 1101 also contains an OK button 1106 for instructing execution of the printing process and a cancel button 1107 for cancelling the printing process. In the print setting dialogue 1101, when the user inputs operations of specifying the barcode type and the additional information and pressing the OK button 1106, the graphics engine 420 receives the input of operations, converts the electronic document 701 into drawing data (Step S3), and sends the drawing data to the printer driver 430 together with a print condition containing the specified barcode type and the specified additional information as a barcode generation parameter. In the example of the electronic document 701 illustrated in FIG. 8, the text regions 710 to 713 are represented by the drawing commands for a character string and the accompanying data, and the graphic regions 720 and 721 are represented by the drawing commands for an image and the accompanying data. In this example, it is assumed that QR is specified as the barcode type and the confidential information is specified as the additional information.

Figure 10:
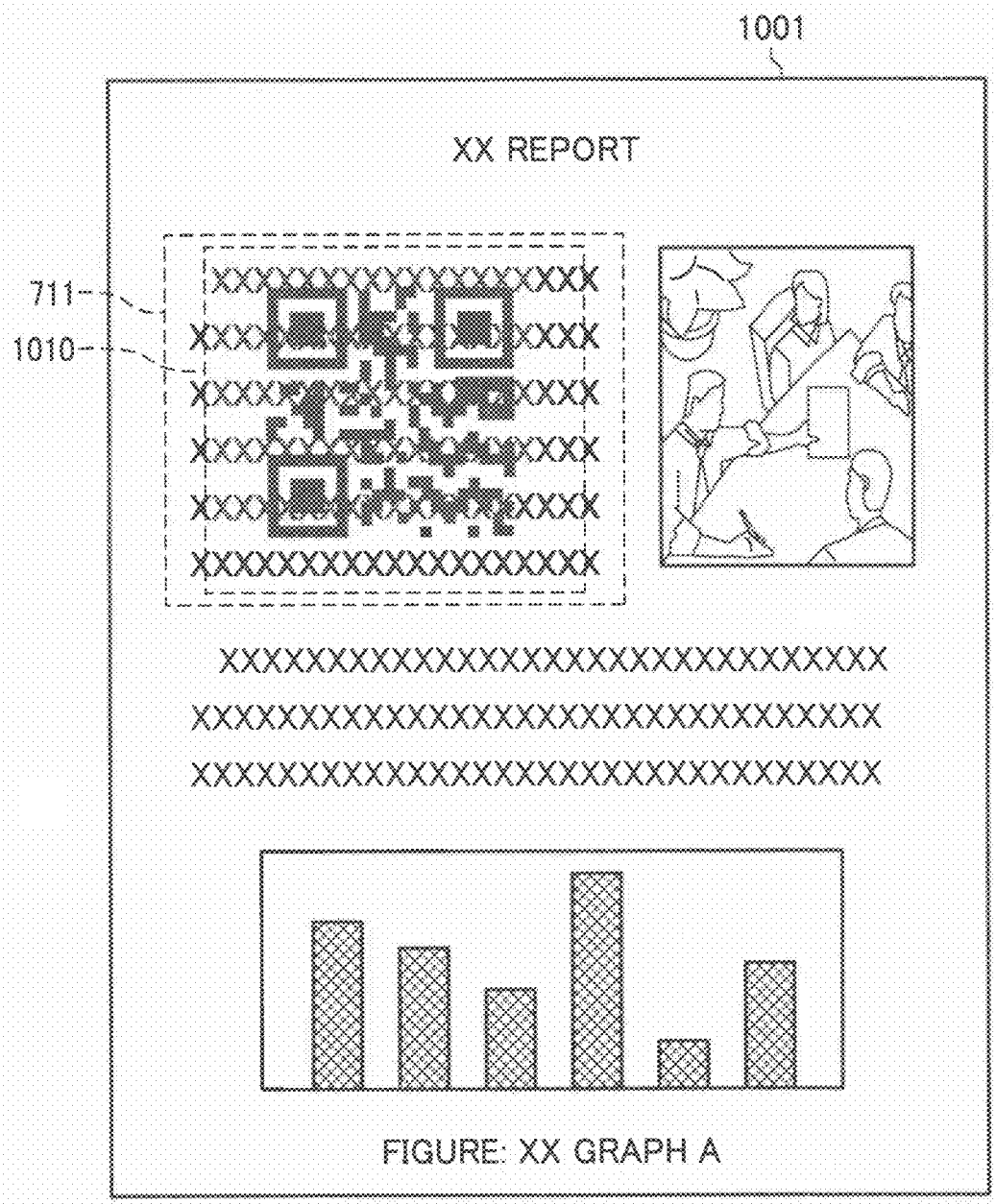
FIG. 10 is a diagram illustrating an example of a printed document image, onto which a barcode that has been made translucent is superimposed.

When the drawing data and the print condition are sent to the printer driver 430, the printer driver 430 sends the drawing data and the barcode generation parameter to the barcode-embedding processing unit 450. The barcode-embedding processing unit 450 generates a barcode by using the barcode generation parameter sent by the printer driver 430 (Step S4), makes an image of the generated barcode translucent, superimposes the translucent image of the barcode onto an image (document image) of the drawing data sent by the printer driver 430 (Step S5) to thereby generate drawing data to which the barcode is added, and returns the drawing data to the printer driver 430. The printer driver 430 converts the drawing data sent by the barcode-embedding processing unit 450 into print data (Step S6), and sends the print data to the image printing unit 460 of the MFP 102 via the spooler 440 (Step S7). The image printing unit 460 receives the print data from the personal computer 101, and performs a printing process by using the print data (Step S8). As a result, a document image, which is obtained by superimposing the translucent image of the barcode that has been generated at Step S4 onto the electronic document generated at Step S1, is printed on a print medium as illustrated in FIG. 10. As illustrated in FIG. 10, a barcode image 1010, which is of the barcode type specified by the user via the print setting dialogue 1101 illustrated in FIG. 9 and converted from the additional information specified by the user, is made translucent and superimposed onto a document image 1001 corresponding to the electronic document 701 illustrated in FIG. 8. Detailed explanation of FIG. 10 will be given later.

Figure 11:
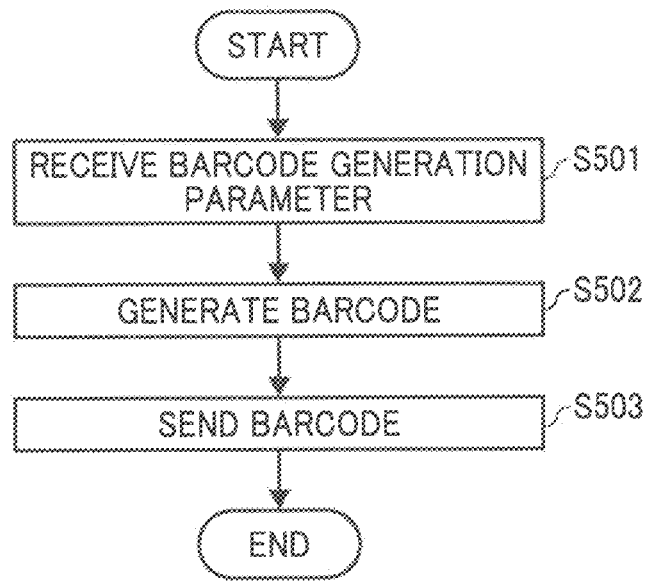
FIG. 11 is a flowchart illustrating a detailed procedure of a process of generating a barcode by a barcode-embedding processing unit.

Next, a detailed procedure of a process of generating a barcode by the barcode-embedding processing unit 450 at Step S4 is explained with reference to FIG. 11. The barcode generating unit 451 of the barcode-embedding processing unit 450 receives the barcode generation parameter from the printer driver 430 (Step S501), and performs encoding according to a rule corresponding to the barcode type contained in the barcode generation parameter by using the additional information contained in the barcode generation parameter, so that a barcode is generated (Step S502). Then, the barcode generating unit 451 sends the barcode generated at Step S502 to the barcode superimposing unit 453 (Step S503).

Next, a detailed procedure of a process of superimposing the barcode onto the image by the barcode-embedding processing unit 450 at Step S5 is explained with reference to FIG. 12. The barcode superimposing unit 453 of the barcode-embedding processing unit 450 receives the barcode sent by the barcode generating unit 451 at Step S503 and the drawing data sent by the printer driver 430 (Step S801), and makes a barcode image translucent (Step S802). At this time, the barcode superimposing unit 453 makes a black background portion and a white background portion of the barcode image translucent at different transparencies. This process will be described in detail later. Subsequently, the barcode superimposing unit 453 superimposes the barcode image that has been made translucent at Step S802 onto the image (document image) of the drawing data received at Step S801 to thereby generate drawing data to which the barcode is added (Step S803). At this time, in the document image, a region onto which the barcode image is superimposed is not limited. Subsequently, the barcode superimposing unit 453 returns the drawing data generated at Step S803 to the printer driver 430 (Step S804).

A desirable transparency for making the barcode image translucent is explained below with reference to FIG. 13. In the first embodiment, in order to make the barcode image recognizable and allow a user to read an image in a portion onto which the barcode image is superimposed, transparency is set for each of the black background portion and the white background portion of the barcode image such that a color of an image in a portion overlapping the white background portion of the barcode image becomes brighter than a color of the black background portion of the barcode image. The white background portion is a region formed of pixels representing white (referred to as white pixels) and the black background portion is a region formed of pixels representing black (referred to as black pixels). In FIG. 13, a character string "ABODE" colored in black and written on a white background is illustrated as a document image, and a translucent barcode image is overlapped with a character string "BCD" being a part of the image. In the following, it is assumed that the document image and the barcode image are converted into grayscale data for convenience of explanation. The grayscale data is data representing a monotone image with 256 gradations in which the brightness of a black pixel is "0" and the brightness of a white pixel is "255". Furthermore, it is presumed that the brightness of the black background portion of each of the barcode image and the document image (L(Bb) and L(Cb)) is "0", and the brightness of the white background portion of each of the barcode image and the document image (L(Bw) and L(Cw)) is "255". Moreover, a transparency a takes a value in a range of "0 to 255", where "0" represents full opacity and "255" represents full transparency.

Assuming that the transparency of the black background portion of the barcode image is $\alpha(Bb)$ and the transparency of the white background portion of the barcode image is $\alpha(Bw)$, the brightness L(Bb/Bw) of the black background portion of the barcode image overlapping the white background portion of the document image becomes equal to $\alpha(Bb)$. Furthermore, the brightness L(Cb/Bw) of the black background portion of the document image overlapping the white background portion of the barcode image becomes equal to "255−$\alpha(Bw)$". To make the barcode image recognizable, it is necessary to accurately recognize the white background portion and the black background portion of the barcode image, and thus it is necessary to make the document image in the portion overlapping the white background portion of the barcode image deletable. The document image is to be deleted by binarization. Therefore, a conditional expression represented by the following Expression (1) needs to be satisfied.

$$L(Bb/Bw) < L(Cb/Bw) \quad (1)$$

When the above conditional expression is expanded, a conditional expression represented by the following Expression (2) is consequently obtained.

$$\alpha(Bb) + \alpha(Bw) < 255 \quad (2)$$

As a left-hand value of Expression (2) comes closer to "0", the barcode image is more easily recognized. However, it becomes more difficult for a user to read the document image. More specifically, when a value $\alpha(Bw)$ comes closer to "0", the density of the document image in the portion overlapping the white background portion of the barcode image is decreased, so that it becomes difficult for a user to read the document image. On the other hand, when a value $\alpha(Bb)$ comes closer to "0", it becomes difficult to distinguish between the black background portion of the barcode image and the black background portion of the document image, and also it becomes difficult for a user to read the document image. In consideration of the above, the values $\alpha(Bb)$ and $\alpha(Bw)$ are separately determined and set. In the first embodiment, it is assumed that the value $\alpha(Bb)$ is set to "90" and the value $\alpha(Bw)$ is set to "110".

FIG. 10 is a diagram illustrating the document image onto which the barcode image is superimposed by the barcode superimposing unit 453 at Step S803. In the document image 1001 illustrated in FIG. 10, the barcode image 1010 being a QR code that has been made translucent is superimposed in the center of the text region 711. Because the QR code is made translucent, a user can read a character string being the contents of the image of the text region 711. A frame line surrounding the barcode image 1010 is an auxiliary line drawn for visualization, and does not actually appear. The same is applied to a frame line surrounding the text region 711.

Figure 14:
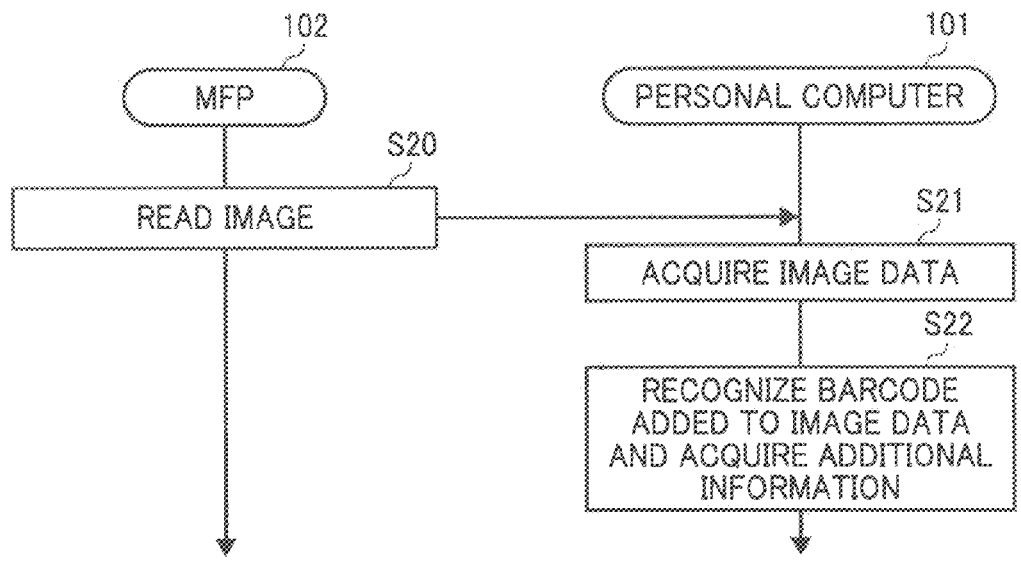
FIG. 14 is a flowchart illustrating a procedure of a process of reading a barcode from a print medium on which an image with a superimposed barcode is printed.

Described below with reference to FIG. 14 is a procedure of a process of reading the barcode from a print medium on which the above-mentioned image with the superimposed barcode is printed. The image reading unit 1210 of the MFP 102 reads an image appearing on the print medium set on the MFP 102, and generates image data of the image (Step S20).

On the other hand, the TWAIN driver 1220 of the personal computer 101 directly accesses the MFP 102 to acquire the image data (Step S21), and sends the image data to the application 1230. The application 1230 receives the image data sent at Step S21, and sends the image data to the barcode reading unit 1240. The barcode reading unit 1240 receives the image data from the application 1230, recognizes an image of the barcode added to the image data, decodes the barcode according to a predetermined rule to thereby acquire additional information converted into the barcode and embedded into the image, and returns the additional information as a recognition result to the application 1230 (Step S22). The application 1230 receives the additional information from the barcode reading unit 1240 and appropriately performs a process by using the additional information. What process is to be performed by using the additional information is not limited.

Figure 15:
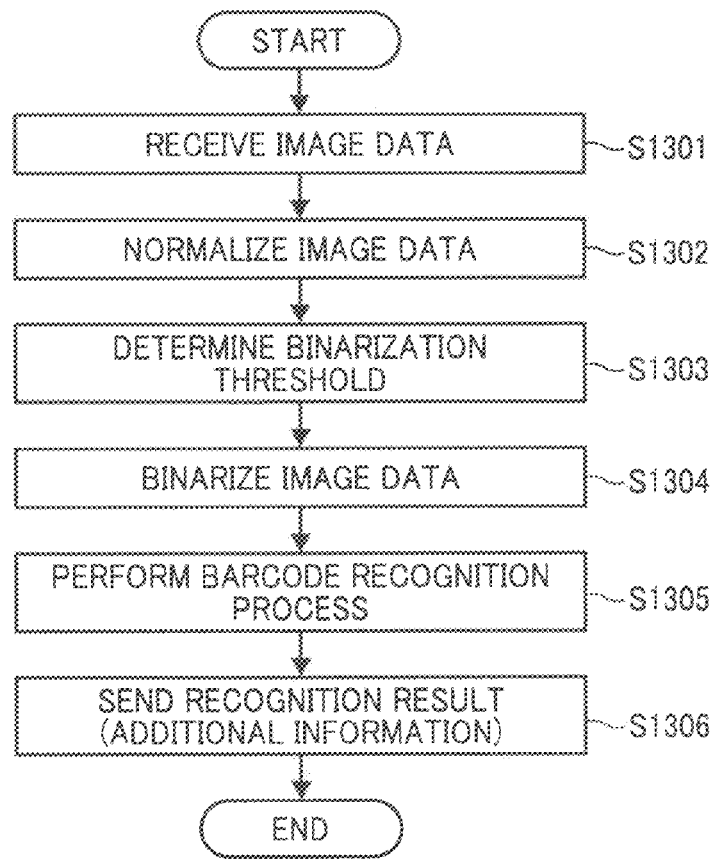
FIG. 15 is a flowchart illustrating a detailed procedure of a process performed by a barcode reading unit.

Next, a detailed procedure of a process performed by the barcode reading unit 1240 is explained with reference to FIG. 15. The barcode reading unit 1240 receives the image data from the application 1230 (Step S1301), and performs a process of normalizing the image data (Step S1302). This process is a process of converting each pixel value of the image data so that the minimum brightness of the pixels constituting the image data becomes "0" and the maximum brightness of the pixels constituting the image data becomes "255". Then, the barcode reading unit 1240 determines a binarization threshold (Step S1303). In this process, the transparencies of the black background portion and the white background portion of the barcode image, which are used by the barcode superimposing unit 453 when embedding the barcode, are used. For example, as explained with reference to FIG. 13, assuming that the transparency of the black background portion of the barcode image is $\alpha(Bb)$ and the transparency of the white background portion of the barcode image is $\alpha(Bw)$, the brightness $L(Bb/Cw)$ of the black background portion of the barcode image overlapping the white background portion of the document image becomes equal to $\alpha(Bb)$ and the brightness $L(Cb/Bw)$ of the document image in the portion overlapping the white background portion of the barcode image becomes equal to "$255-\alpha(Bw)$". By taking an intermediate value of the above pieces of brightness as the binarization threshold, it is possible to delete the document image in the portion overlapping the white background portion of the barcode image. In other words, a binarization threshold Th to be determined is represented by the following Equation (3) for example.

$$Th=\{\alpha(Bb)+255-\alpha(Bw)\}/2 \quad (3)$$

Figure 16:
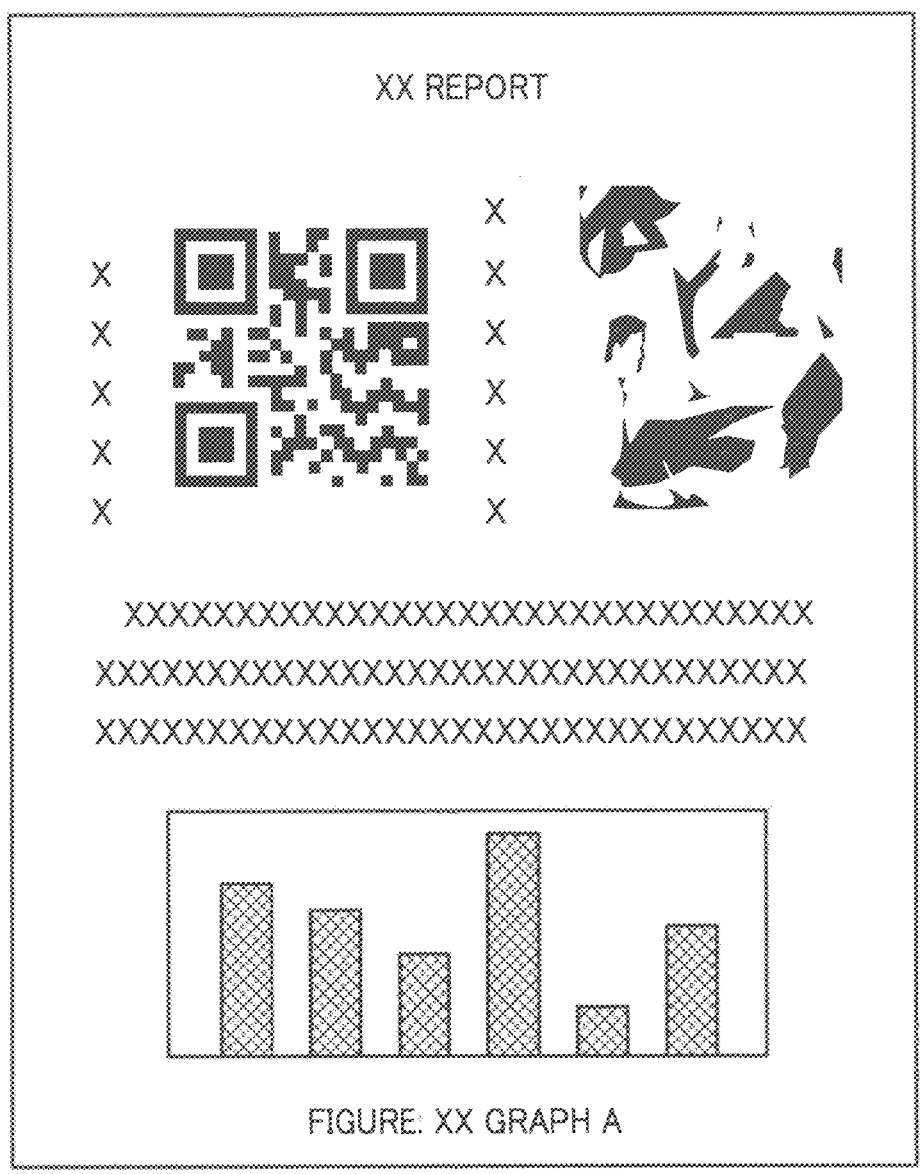
FIG. 16 is a diagram illustrating an image of image data that is obtained by binarizing image data illustrated in FIG. 10 by the barcode reading unit using a binarization threshold.

As described above with reference to FIG. 13, in the first embodiment, because "$\alpha(Bb)=90$" and "$\alpha(Bw)=110$", when they are applied to Equation (3), the binarization threshold becomes "118". Subsequently, the barcode reading unit 1240 binarizes the image data by using the binarization threshold determined at Step S1303 (Step S1304). FIG. 16 is a diagram illustrating an image of image data that is obtained by binarizing the image data illustrated in FIG. 10 by the barcode reading unit 1240 using the binarization threshold. In FIG. 16, it is illustrated that the document image in the portion overlapping the white background of the barcode image is deleted by using an appropriate binarization threshold. In this manner, by deleting the image overlapping the barcode image, it is possible to extract the barcode image itself, so that it is possible to recognize the barcode image. The barcode reading unit 1240 recognizes the barcode image on the image data binarized at Step S1304 (Step S1305), decodes the barcode to thereby acquire the additional information converted to the barcode and embedded into the image, and returns the additional information as the recognition result to the application 1230 (Step S1306).

With the above configuration, when various additional information such as confidential information is embedded into a document image to be printed, because the barcode image is made translucent and then superimposed onto the document image, it is possible to make the contents of the document image readable for a user and to reliably embed the additional information into the document image regardless of a type of the document. Furthermore, the translucent barcode image is extracted from the document image by binarization using a difference in transparency, so that it is possible to accurately recognize the barcode image and accurately decode and acquire the additional information from the barcode.

Next, an image processing apparatus, an image processing method, and a computer readable storage medium having stored therein an image processing program according to a second embodiment of the present invention are explained. Components and processes identical to those of the first embodiment described above are denoted by identical symbols, and explanation thereof will be omitted appropriately.

Figure 17:
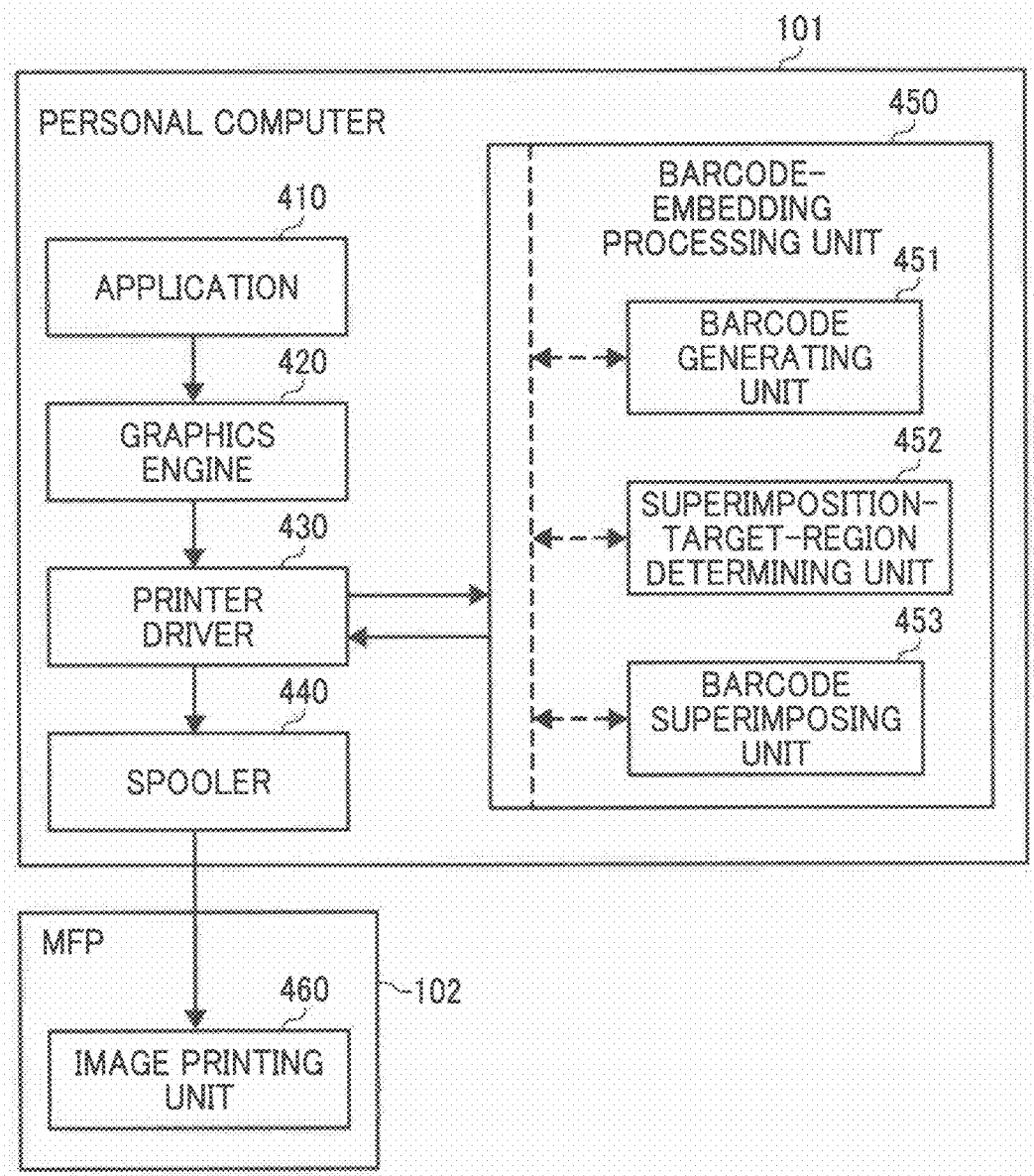
FIG. 17 is a diagram illustrating a functional configuration related to a printing process in an image processing system according to a second embodiment.

In the first embodiment described above, a region onto which the barcode image is superimposed is not specifically limited. However, in the second embodiment, a region onto which the barcode image is superimposed (referred to as a superimposition target region) is determined. FIG. 17 is a diagram illustrating a functional configuration related to a printing process in the image processing system according to the second embodiment. As illustrated in FIG. 17, the barcode-embedding processing unit 450 included in the personal computer 101 includes a superimposition-target-region determining unit 452 in addition to the barcode generating unit 451 and the barcode superimposing unit 453.

The superimposition-target-region determining unit 452 is a module that determines a region onto which the barcode image is superimposed (referred to as a superimposition target region) by using the drawing data received from the printer driver 430, and sends superimposition target region information indicating the determined superimposition target region to the barcode superimposing unit 453. In the second embodiment, a region containing the largest number of characters is determined to be the superimposition target region.

The barcode superimposing unit 453 receives the superimposition target region information in addition to the drawing data and the barcode, generates drawing data to which the barcode is added by superimposing the barcode image onto the superimposition target region indicated by the superimposition target region information in the image of the drawing data, and sends the drawing data to the printer driver 430.

Next, a procedure of a printing process performed by the image processing system according to the second embodiment is explained with reference to FIG. 18. Steps S1 to S4 are identical to those of the first embodiment described above. After Step S4, at Step S10, the barcode-embedding processing unit 450 of the personal computer 101 receives the drawing data sent by the printer driver 430, and determines the superimposition target region by using the drawing data. At Step S5, an image of the barcode generated at Step S4 is made translucent and is superimposed onto the superimposition target region determined at Step S10 in the image (document image) of the drawing data sent by the printer driver 430, so that drawing data to which the barcode is added is generated. Subsequently, the drawing data is returned to the printer driver 430. Steps S6 to S8 are identical to those of the first embodiment described above.

Figure 19:
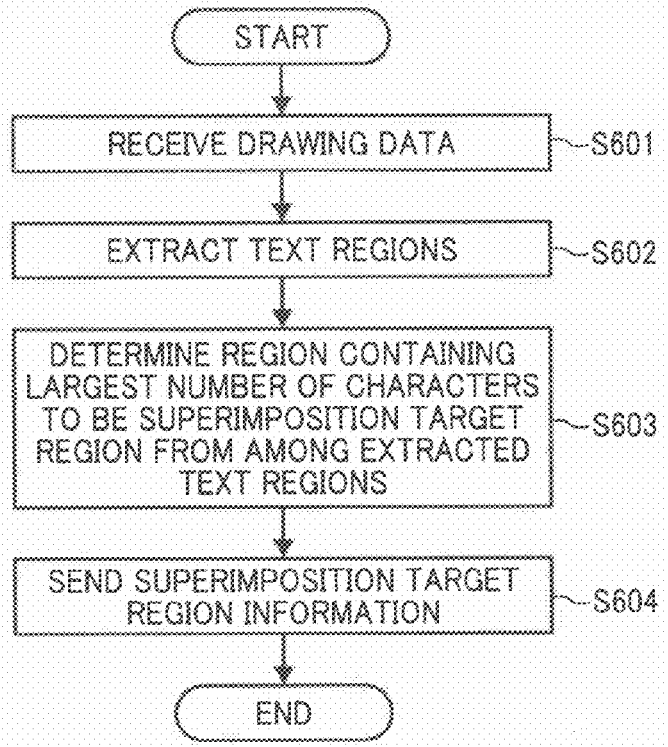
FIG. 19 is a flowchart illustrating a detailed procedure of a process of determining a superimposition target region by the barcode-embedding processing unit.

Next, a detailed procedure of a process of determining the superimposition target region by the barcode-embedding processing unit 450 at Step S10 is explained with reference to FIG. 19. The superimposition-target-region determining unit 452 of the barcode-embedding processing unit 450 receives the drawing data sent by the printer driver 430 (Step S601), analyzes the drawing data, and extracts text regions (Step S602). Then, the superimposition-target-region determining unit 452 determines a text region containing the largest number of characters to be the superimposition target region from among the text regions extracted at Step S602 (Step S603). More specifically, for example, the superimposition-target-region determining unit 452 refers to the accompanying data corresponding to the drawing command for a "character string" in the drawing data as illustrated in FIGS. 5A and 5B, counts the number of characters in a "character string" contained in each accompanying data, and determines a text region corresponding to the drawing command having the largest number of characters to be the superimposition target region. In the example of the electronic document 701 illustrated in FIG. 8, the text region 711 contains the largest number of characters among the text regions 710 to 713, so that the text region 711 is determined to be the superimposition target region. Subsequently, the superimposition-target-region determining unit 452 sends the superimposition target region information indicating the superimposition target region determined at Step S603 to the barcode superimposing unit 453 (Step S604).

Figure 20:
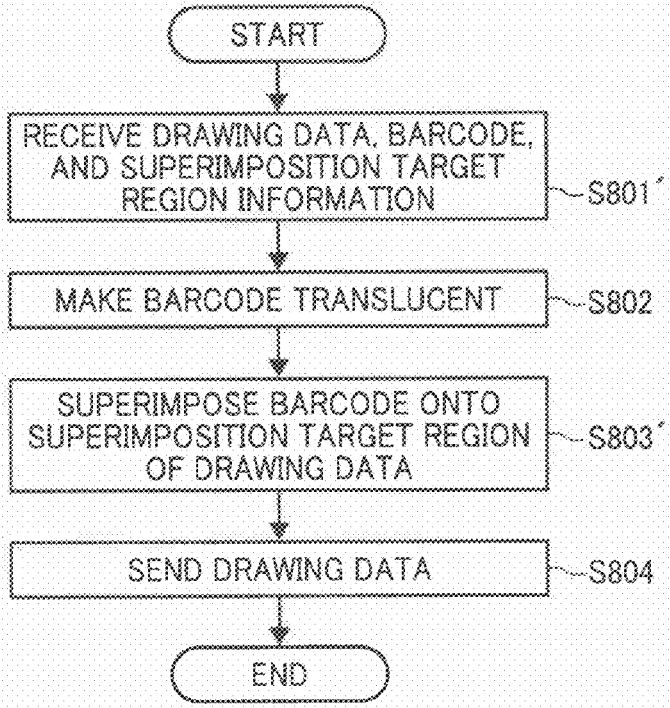
FIG. 20 is a flowchart illustrating a detailed procedure of a process of superimposing a barcode onto an image by the barcode-embedding processing unit.

Next, a detailed procedure of a process of superimposing the barcode image by the barcode-embedding processing unit 450 at Step S5 is explained with reference to FIG. 20. The barcode superimposing unit 453 of the barcode-embedding processing unit 450 receives the barcode generated at Step S4, i.e., the barcode sent by the barcode generating unit 451 at Step S503 of FIG. 11, the drawing data sent by the printer driver 430, and the superimposition target region information indicating the superimposition target region determined at Step S10, i.e., the superimposition target region information sent by the superimposition-target-region determining unit 452 at Step S604 of FIG. 19 (Step S801'), and makes a barcode image translucent (Step S802). A method of making the barcode image translucent is the same as that of the first embodiment described above. Subsequently, the barcode superimposing unit 453 superimposes the barcode image that has been made translucent at Step S802 onto the superimposition target region indicated by the superimposition target region information received at Step S801' in the image (document image) of the drawing data received at Step S801', so that drawing data to which the barcode is added is generated (Step S803'). At this time, the barcode superimposing unit 453 superimposes the barcode image of the largest possible size to fit in the center of the superimposition target region, i.e., of the maximum size that can be superimposed within the superimposition target region. This size change is performed in order to relatively reduce influence of image noise in reading the barcode and to make the recognition of the barcode image easier. Furthermore, because the barcode is sufficiently enlarged compared to characters and the like, there is an advantage in that a user can easily view diagrams and photographs. In the example of FIG. 10, the barcode image 1010 being a translucent QR code in substantially the same size as that of the text region 711 is superimposed in the center of the text region 711 that has been determined to be the superimposition target region in the document image 1001. Subsequently, the barcode superimposing unit 453 returns the drawing data generated at Step S803' to the printer driver 430 (Step S804).

As described above, drawing data to which the barcode is added is generated by determining a text region containing the largest number of characters to be the superimposition target region and superimposing a translucent barcode image onto the superimposition target region. With this configuration, it is possible to make the contents of the document image readable for a user, reliably embed the additional information into the document image, enable accurate recognition of the barcode image, and assuredly decode and acquire the additional information from the barcode, regardless of a type of the document. Furthermore, because the barcode is superimposed onto the text region containing the largest number of characters in a printed image of the drawing data, if a user blacks out or cuts out the barcode, the character in the text region may become unreadable. Therefore, by determining the text region containing the largest number of characters to be the superimposition target region on assumption that such a text region is a highly-important region, and superimposing the barcode image onto this text region, it is possible to reduce the possibility that the barcode is blacked out or cut out, so that the security can be ensured.

Next, an image processing apparatus, an image processing method, and a computer readable storage medium having stored therein an image processing program according to a third embodiment of the present invention are explained. Components and processes identical to those of the first and the second embodiments described above are denoted by identical symbols, and explanation thereof will be omitted appropriately.

In the third embodiment, the superimposition-target-region determining unit 452 described in the second embodiment determines, from among the text regions, a text region containing the largest number of numerals to be the superimposition target region by using the drawing data received from the printer driver 430.

Figure 21:
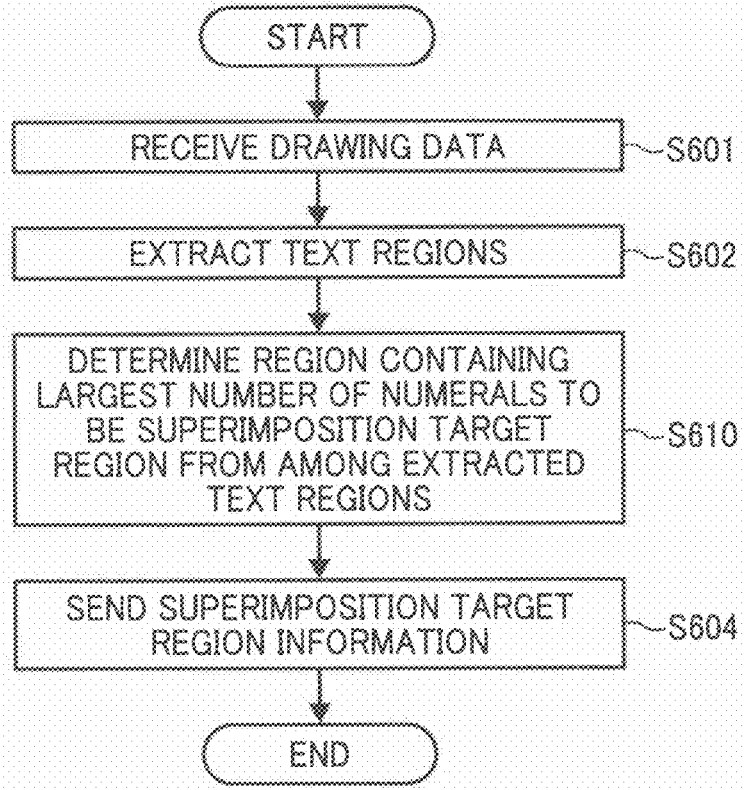
FIG. 21 is a flowchart illustrating a detailed procedure of a process of determining a superimposition target region by a barcode-embedding processing unit according to a third embodiment.

Next, a procedure of a printing process performed by the image processing system according to the third embodiment is explained. The procedure of the printing process itself is substantially the same as that of FIG. 18, and therefore, explanation thereof is omitted. In the third embodiment, a detailed procedure of the process of determining the superimposition target region by the barcode-embedding processing unit 450 at Step S10 is different from that of the second embodiment described above. FIG. 21 is a flowchart illustrating a detailed procedure of the process of determining the superimposition target region by the barcode-embedding processing unit 450 at Step S10 according to the third embodiment. Steps S601 and S602 are identical to those of the second embodiment described above. At Step S610, the superimposition-target-region determining unit 452 determines a text region containing the largest number of numerals to be the superimposition target region from among the text regions extracted at Step S602. More specifically, for example, the superimposition-target-region determining unit 452 refers to the accompanying data corresponding to the drawing command for a "character string" in the drawing data as illustrated in FIGS. 5A and 5B, counts the number of numerals in a "character string" contained in each accompanying data, and determines a text region corresponding to the drawing command having the largest number of numerals to be the superimposition target region. In the example of the electronic document 701 illustrated in FIG. 8, the text region 712 contains the largest number of numerals among the text regions 710 to 713, so that the text region 712 is determined to be the superimposition target region. Step S604 is identical to that of the second embodiment.

Figure 18:
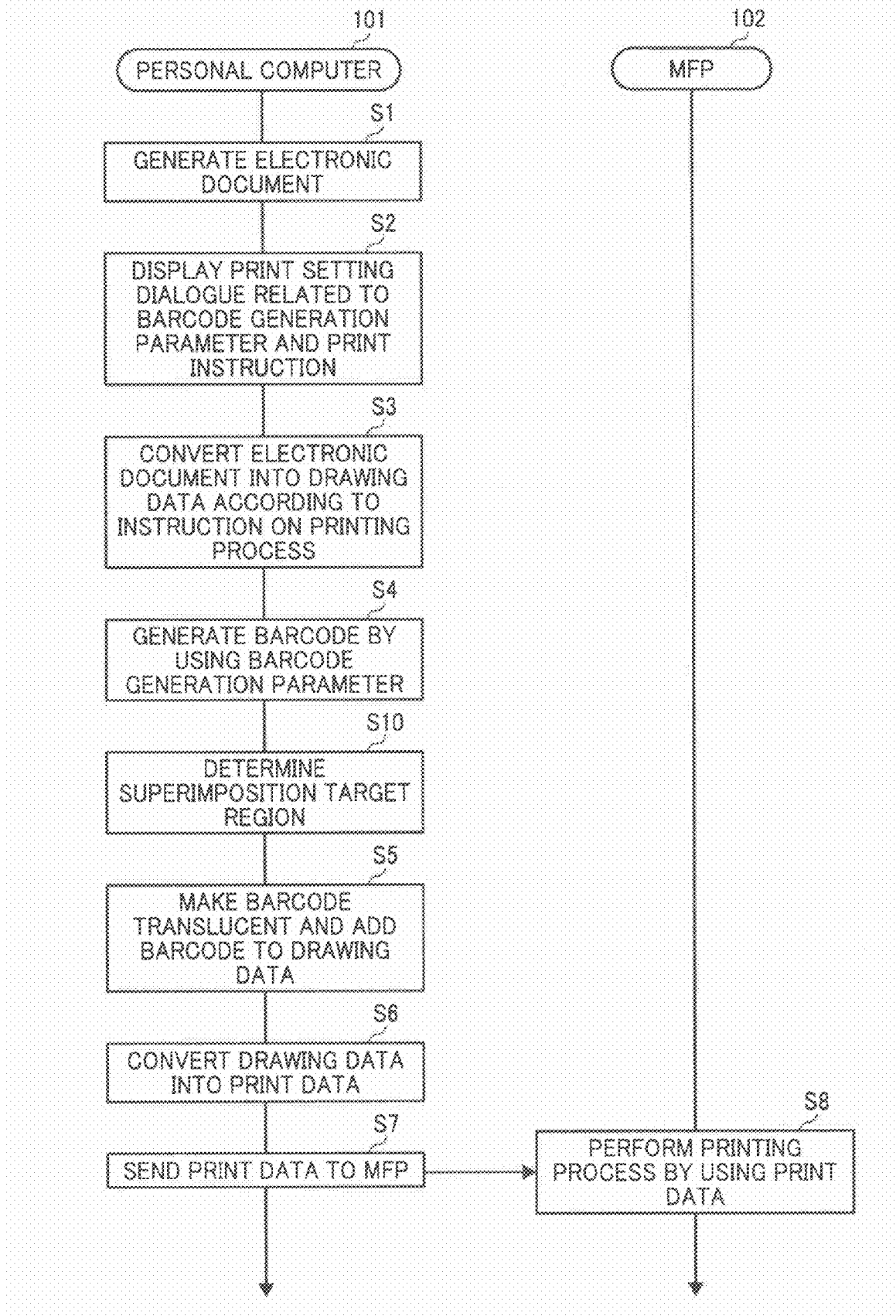
FIG. 18 is a flowchart illustrating a procedure of a printing process performed by the image processing system.
Figure 22:
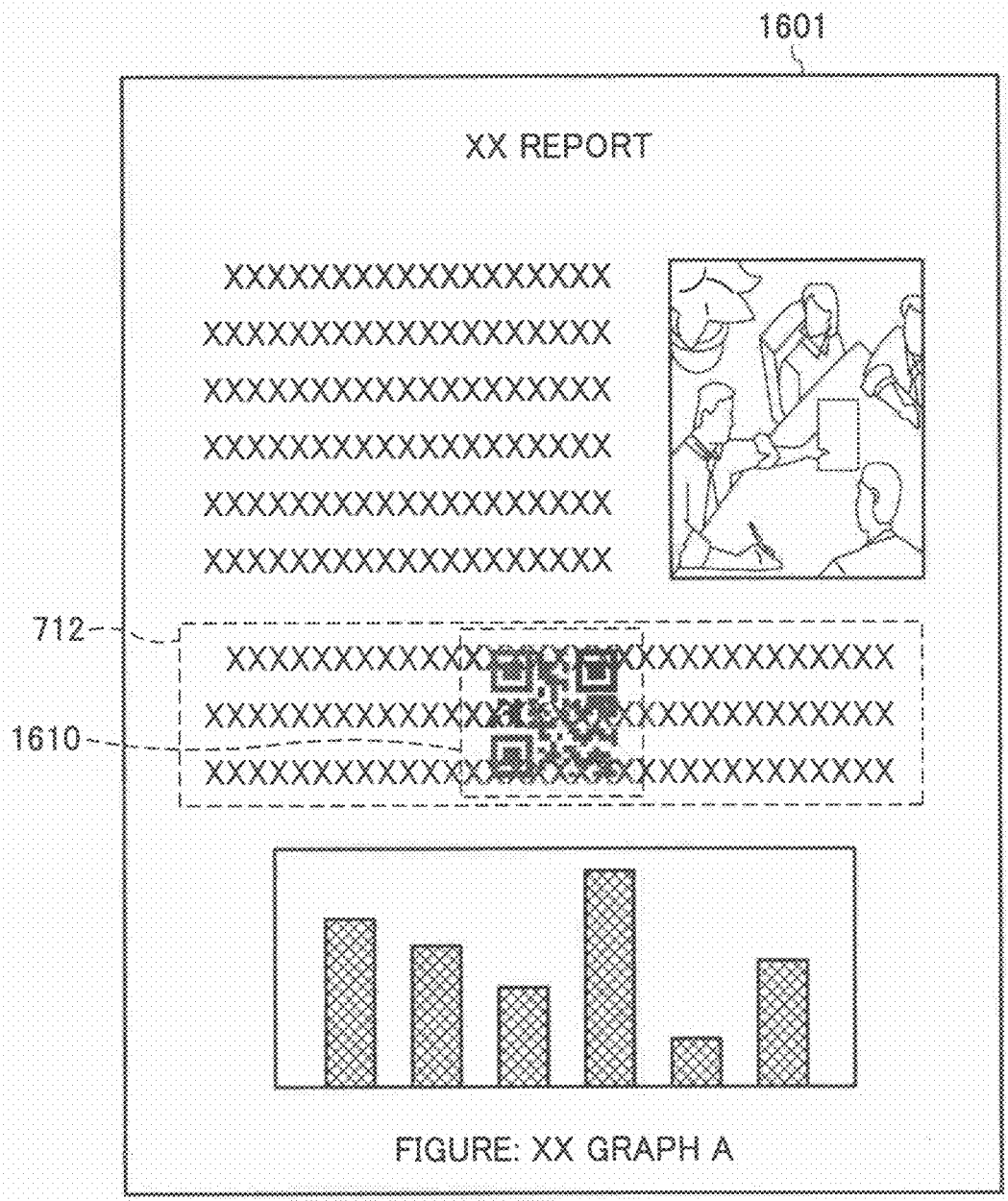
FIG. 22 is a diagram illustrating an example of a printed document image, onto which a barcode that has been made translucent is superimposed.

At Step S5 of FIG. 18, similarly to the first embodiment described above, an image of the barcode generated at Step S4 is made translucent, and is superimposed onto the superimposition target region determined at Step S10 in the document image. Subsequently, the processes at Steps S6 to S8 are performed and the document image is printed on a print medium, which is illustrated in FIG. 22. In the example of FIG. 22, a barcode image 1610 being a translucent QR code is superimposed in the center of the text region 712 that has been determined to be the superimposition target region in a document image 1601.

With the above configuration, when a barcode image is superimposed onto the text region containing the largest number of numerals in a document such as a quotation in which numerals are important, it is most unlikely that the barcode is blacked out or cut out because by doing so numerals in the text region may become unreadable. Therefore, by determining the text region containing the largest number of numerals to be the superimposition target region on assumption that such a text region is a highly-important region, and superimposing the barcode image onto this text region, it is possible to reduce the possibility that the barcode is blacked out or cut out, so that the security can be ensured.

Next, an image processing apparatus, an image processing method, and a computer readable storage medium having stored therein an image processing program according to a fourth embodiment of the present invention are explained. Components and processes identical to those of the first to the third embodiments described above are denoted by identical symbols, and explanation thereof will be omitted appropriately.

In the fourth embodiment, the superimposition-target-region determining unit 452 determines, from among the text regions, a text region containing the largest number of specific character strings being a keyword to be the superimposition target region by using the drawing data received from the printer driver 430. The specific character string is specified by a user via the print setting dialogue 1101 as illustrated in FIG. 9 for example.

Figure 23:
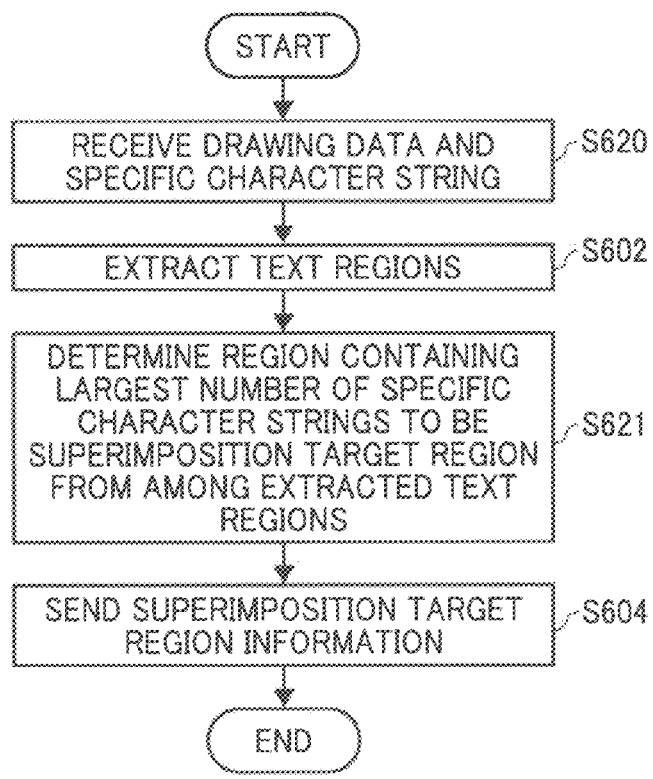
FIG. 23 is a flowchart illustrating a detailed procedure of a process of determining a superimposition target region by a barcode-embedding processing unit according to a fourth embodiment.

Next, a procedure of a printing process performed by the image processing system according to the fourth embodiment is explained. The procedure of the printing process itself is substantially the same as that of FIG. 18, and therefore, explanation thereof is omitted. However, at Step S3, the graphics engine 420 receives the input of operations from a user, converts the electronic document 701 into drawing data, and sends a specified specific character string and the drawing data to the printer driver 430 together with the print condition containing the specified barcode type and the additional information as the barcode generation parameter. Furthermore, in the fourth embodiment, a detailed procedure of the process of determining the superimposition target region by the barcode-embedding processing unit 450 at Step S10 is different from that of the second embodiment described above. FIG. 23 is a flowchart illustrating a detailed procedure of the process of determining the superimposition target region by the barcode-embedding processing unit 450 at Step S10 according to the fourth embodiment. At Step S620, the superimposition-target-region determining unit 452 receives the drawing data and the specific character string sent by the printer driver 430. Step S602 is identical to that of the second embodiment described above. At Step S621, the superimposition-target-region determining unit 452 determines a text region containing the largest number of the specific character strings received at Step S620 to be the superimposition target region from among the text regions extracted at Step S602. More specifically, for example, the superimposition-target-region determining unit 452 refers to the accompanying data corresponding to the drawing command for a "character string" in the drawing data as illustrated in FIGS. 5A and 5B, counts the number of the specific character strings in a "character string" contained in each accompanying data, and determines a text region corresponding to the drawing command having the largest number of the specific character strings to be the superimposition target region. Step S604 is identical to that of the second embodiment described above.

With the above configuration, when a barcode image is superimposed onto the text region containing the largest number of specific character strings in a document such as an in-house confidential document in which the specific character string has important implications, it is most unlikely that the barcode is blacked out or cut out. Therefore, by determining the text region containing the largest number of specific character strings to be the superimposition target region on assumption that such a text region is a highly-important region, and superimposing the barcode image onto this text region, it is possible to reduce the possibility that the barcode is blacked out or cut out, so that the security can be ensured.

Next, an image processing apparatus, an image processing method, and a computer readable storage medium having stored therein an image processing program according to a fifth embodiment of the present invention are explained. Components and processes identical to those of the first to the fourth embodiments described above are denoted by identical symbols, and explanation thereof will be omitted appropriately.

In the fifth embodiment, the superimposition-target-region determining unit 452 determines a graphic region having the maximum image area to be the superimposition target region, from among graphic regions in which images containing at least one of a diagram appear, such as a graph, and a photograph, by using the drawing data received from the printer driver 430.

Figure 24:
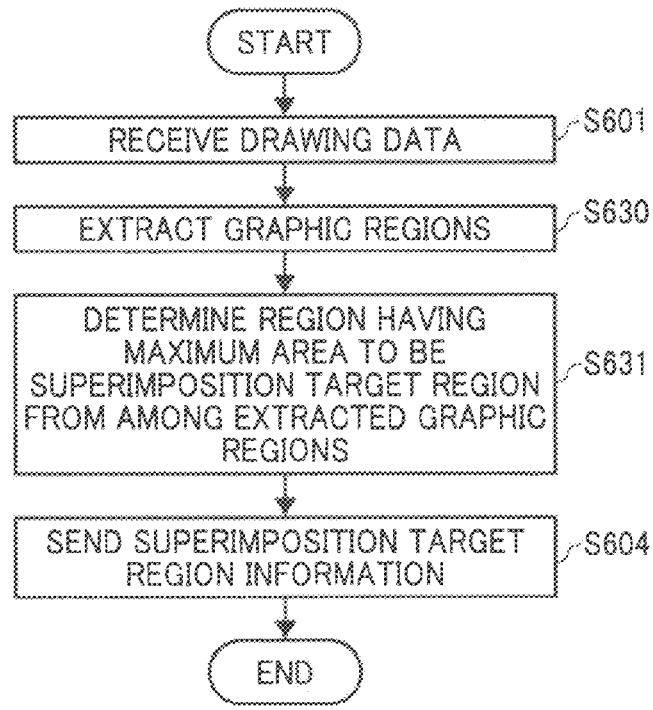
FIG. 24 is a flowchart illustrating a detailed procedure of a process of determining a superimposition target region by a barcode-embedding processing unit according to a fifth embodiment.

Next, a procedure of a printing process performed by the image processing system according to the fifth embodiment is explained. The procedure of the printing process itself is substantially the same as that of FIG. 18, and therefore, explanation thereof is omitted. In the fifth embodiment, a detailed procedure of the process of determining the superimposition target region by the barcode-embedding processing unit 450 at Step S10 is different from that of the second embodiment described above. FIG. 24 is a flowchart illustrating a detailed procedure of the process of determining the superimposition target region by the barcode-embedding processing unit at Step S10 according to the fifth embodiment. Step S601 is identical to that of the second embodiment described above. At Step S630, the superimposition-target-region determining unit 452 extracts graphic regions, each of which contains at least one of a diagram and a photograph, by analyzing the drawing data. At Step S631, the superimposition-target-region determining unit 452 determines a graphic region having an image that contains at least one of a diagram and a photograph and that has the maximum area to be the superimposition target region from among the graphic regions extracted at Step S630. More specifically, for example, the superimposition-target-region determining unit 452 refers to the accompanying data corresponding to the drawing command for "graphics" in the drawing data as illustrated in FIGS. 5A and 5B, and determines a graphic region corresponding to the drawing command having the largest "size" contained in each accompanying data to be the superimposition target region. Step S604 is identical to that of the second embodiment described above.

With the above configuration, when a barcode image is superimposed onto a graphic region containing the largest diagram or the largest photograph in a document such as a presentation document containing a larger number of drawings and photographs than characters, it is most unlikely that the barcode is blacked out or cut out. Therefore, by determining the graphic region having the image that contains at least one of a diagram and a photograph and that has the maximum area to be the superimposition target region on assumption that such a graphic region is a highly-important region, and superimposing the barcode onto this graphic region, it is possible to reduce the possibility that the barcode is blacked out or cut out, so that the security can be ensured.

Next, an image processing apparatus, an image processing method, and a computer readable storage medium having stored therein an image processing program according to a sixth embodiment of the present invention are explained. Components and processes identical to those of the first to the fifth embodiments described above are denoted by identical symbols, and explanation thereof will be omitted appropriately.

Figure 25:
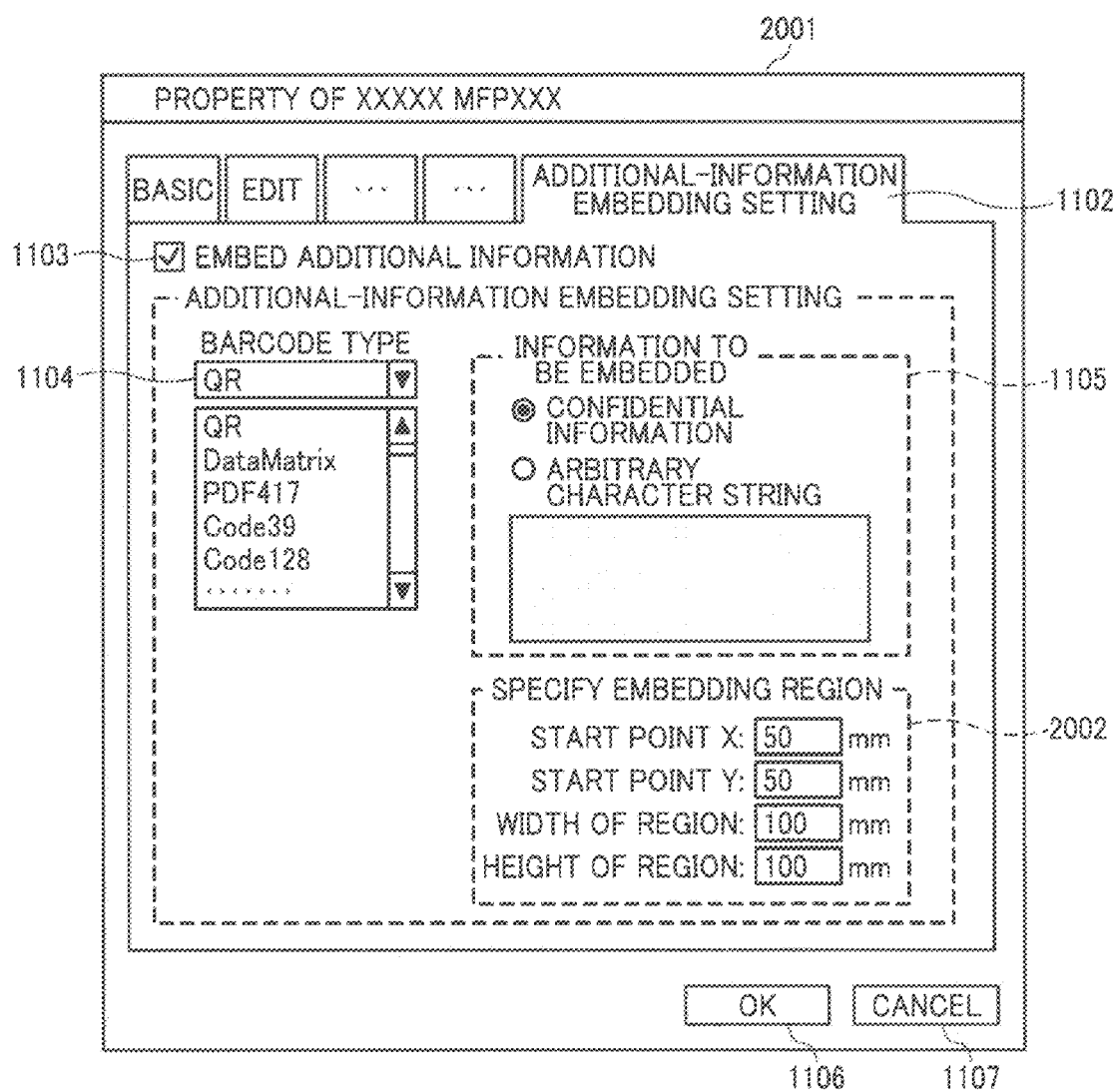
FIG. 25 is a diagram illustrating a print setting dialogue according to a sixth embodiment, which allows a user to specify a superimposition target region.

In the sixth embodiment, a user is allowed to specify the superimposition target region. FIG. 25 is a diagram illustrating a print setting dialogue 2001 for allowing a user to specify the superimposition target region. In the print setting dialogue 2001 illustrated in FIG. 25, a group box 2002 for specifying the superimposition target region is added to the print setting dialogue 1101 illustrated in FIG. 9. In the group box 2002, a user specifies values of X-coordinate of a start point of a region to be specified as the superimposition target region, Y-coordinate of the start point, a width of the region, and a height of the region.

Next, a procedure of a printing process performed by the image processing system according to the sixth embodiment is explained. The procedure of the printing process itself is substantially the same as that of FIG. 18, and therefore, explanation thereof is omitted. However, at Step S2, the application 410 displays the print setting dialogue 2001 as illustrated in FIG. 25 on the display device 207. In the print setting dialogue 2001, when a user performs input of operations of specifying the superimposition target region in the group box 2002 in addition to the barcode type and the additional information and then pressing the OK button 1106, the graphics engine 420 receives the input of operations at Step S3, converts the electronic document 701 into drawing data, and sends the drawing data and superimposition target region information indicating the specified superimposition target region to the printer driver 430 together with the print condition containing the specified barcode type and the additional information as the barcode generation parameter. At Step S10, the barcode-embedding processing unit 450 of the personal computer 101 receives the drawing data and the superimposition target region information sent by the printer driver 430, and determines the superimposition target regions by using the received data and information.

Figure 26:
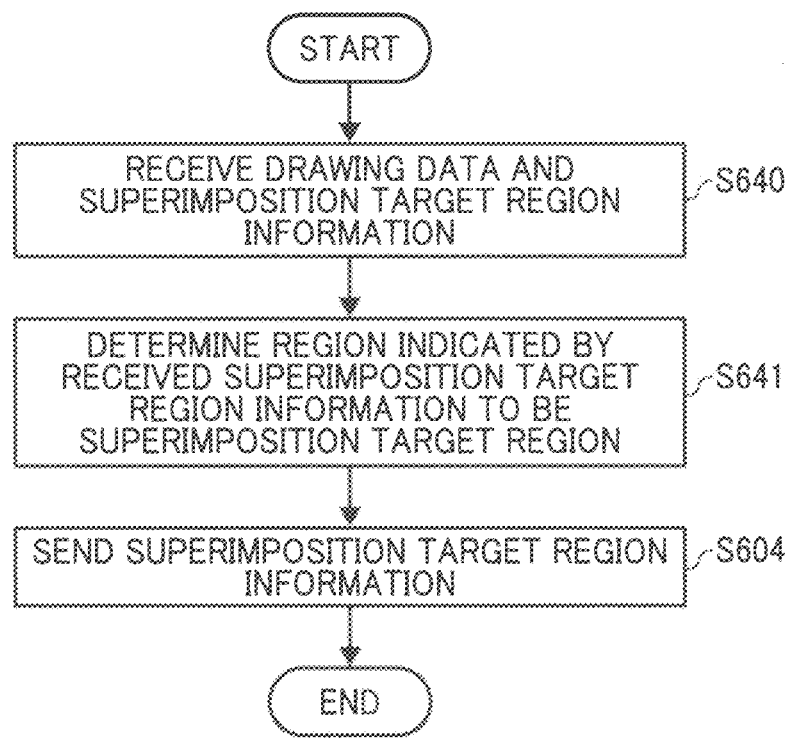
FIG. 26 is a flowchart illustrating a detailed procedure of a process of determining a superimposition target region by a barcode-embedding processing unit according to the sixth embodiment.

A detailed procedure of the process of determining the superimposition target region by the barcode-embedding processing unit 450 at Step S10 is different from that of the second embodiment described above. FIG. 26 is a flowchart illustrating a detailed procedure of the process of determining the superimposition target region by the barcode-embedding processing unit 450 at Step S10 according to the sixth embodiment. At Step S640, the superimposition-target-region determining unit 452 receives the drawing data and the superimposition target region information sent by the printer driver 430. At Step S641, the superimposition-target-region determining unit 452 determines the superimposition target region indicated by the superimposition target region information received at Step S640 to be the superimposition target region. At Step S604, the superimposition target region information is sent to the barcode superimposing unit 453. After Step S10 as described above, the processes at Steps S5 to S8 are performed, so that the document image, which is obtained by superimposing the translucent image of the barcode that has been generated at Step S4 onto the specified superimposition target region in the electronic document generated at Step S1, is printed on a print medium.

With the above configuration, it is possible to allow a user to arbitrarily specify the superimposition target region, so that convenience for the user can be improved.

Next, an image processing apparatus, an image processing method, and a computer readable storage medium having stored therein an image processing program according to a seventh embodiment of the present invention are explained. Components and processes identical to those of the first to the sixth embodiments described above are denoted by identical symbols, and explanation thereof will be omitted appropriately.

Figure 27:
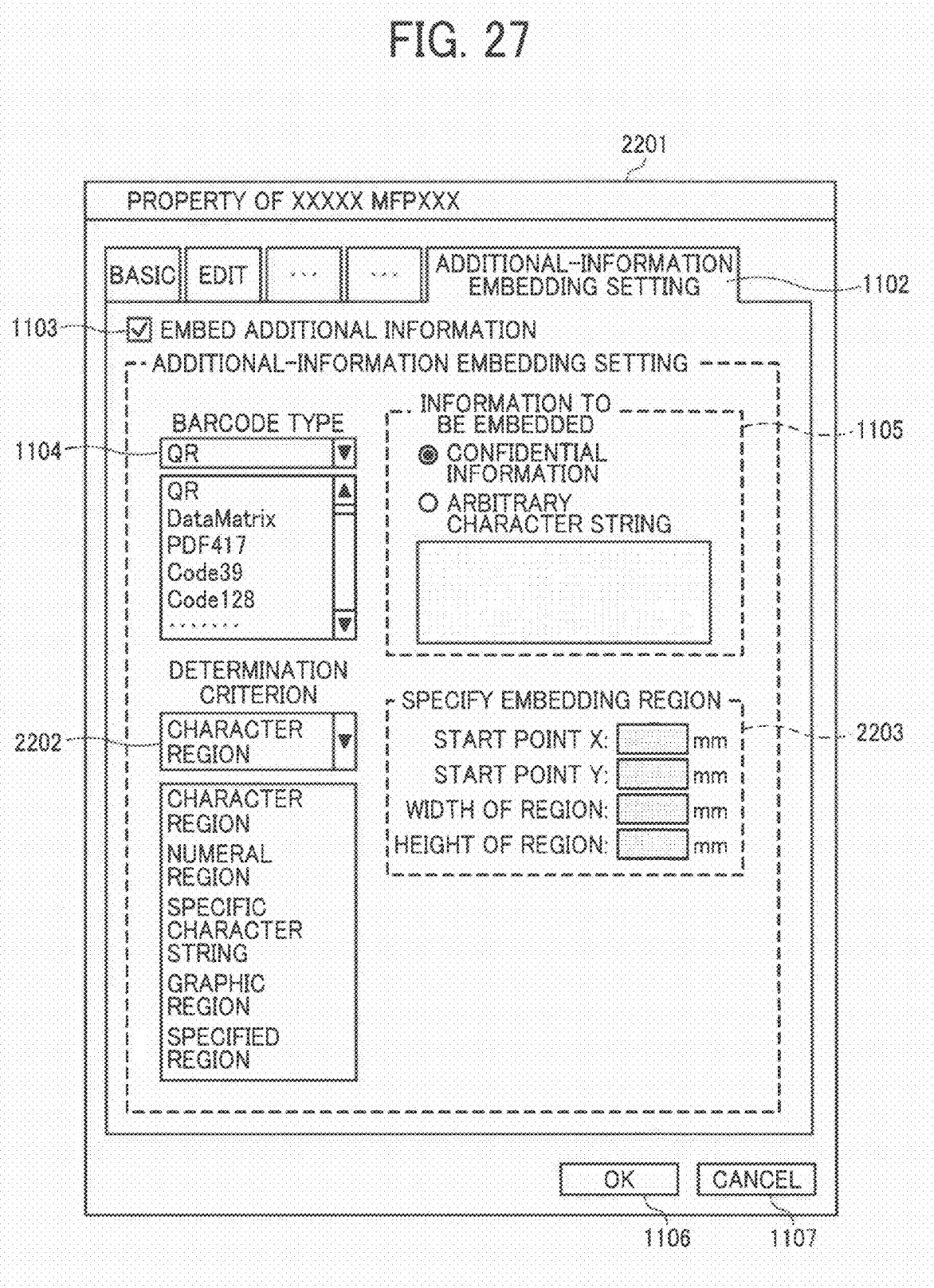
FIG. 27 is a diagram illustrating a print setting dialogue according to a seventh embodiment.

In the seventh embodiment, a user is allowed to select one of the methods of determining the superimposition target region described in the second to the sixth embodiments. FIG. 27 is a diagram illustrating a print setting dialogue according to the seventh embodiment. In a print setting dialogue 2201 illustrated in FIG. 27, a combo box 2202 for specifying a method of determining the superimposition target region (superimposition target region determination criterion) and a group box 2203 for specifying an arbitrary superimposition target region are added to the print setting dialogue 1101 illustrated in FIG. 9. In the combo box 2202, a user is allowed to specify what region is to be determined as the superimposition target region from among (a) a text region containing the largest number of characters, (b) a text region containing the largest number of numerals, (c) a text region containing the largest number of specific characters, (d) a graphic region having an image that contains at least one of a diagram and a photograph and that has the maximum area, and (e) a specific region. When the method of determining the specific region to be the superimposition target region is specified, a user further specifies a value of X-coordinate of a start point of the region, a value of Y coordinate of the start point, a value indicating a width of the region, and a value indicating a height of the region.

In such a print setting dialogue, when the method of determining the superimposition target region is specified, the superimposition-target-region determining unit 452 determines the superimposition target region according to the specified method. The methods for the regions (a) to (e) are already described in the second to the sixth embodiments, and therefore, explanation thereof is not repeated. When the method for the region (e) is specified, the superimposition-target-region determining unit 452 determines the region specified by the group box 2203 to be the superimposition target region.

Next, a procedure of a printing process performed by the image processing system according to the seventh embodiment is explained. The procedure of the printing process itself is substantially the same as that of FIG. 18, and therefore, explanation thereof is omitted. However, at Step S2, the application 410 displays the print setting dialogue 2201 as illustrated in FIG. 27 on the display device 207. In the print setting dialogue 2201, when a user performs input of operations of specifying the method of determining the superimposition target region in the combo box 2202 in addition to the barcode type and the additional information, specifying a specific region in the group box 2203 when the specific region is determined to be the superimposition target region, and pressing the OK button 1106, the graphics engine 420 receives the input of operations at Step S3, converts the electronic document 701 into drawing data, and sends the drawing data and method specification information indicating the specified method of determining the superimposition target region to the printer driver 430 together with the print condition containing the specified barcode type and the specified additional information as the barcode generation parameter. When the region to be the superimposition target region is specified, the graphics engine 420 also sends the superimposition target region information indicating the specified region to the printer driver 430. At Step S10, the barcode-embedding processing unit 450 of the personal computer 101 receives the drawing data, the method specification information, and the superimposition target region information in some cases, which are sent by the printer driver 430, and determines the superimposition target region by using the received data and information.

Figure 28:
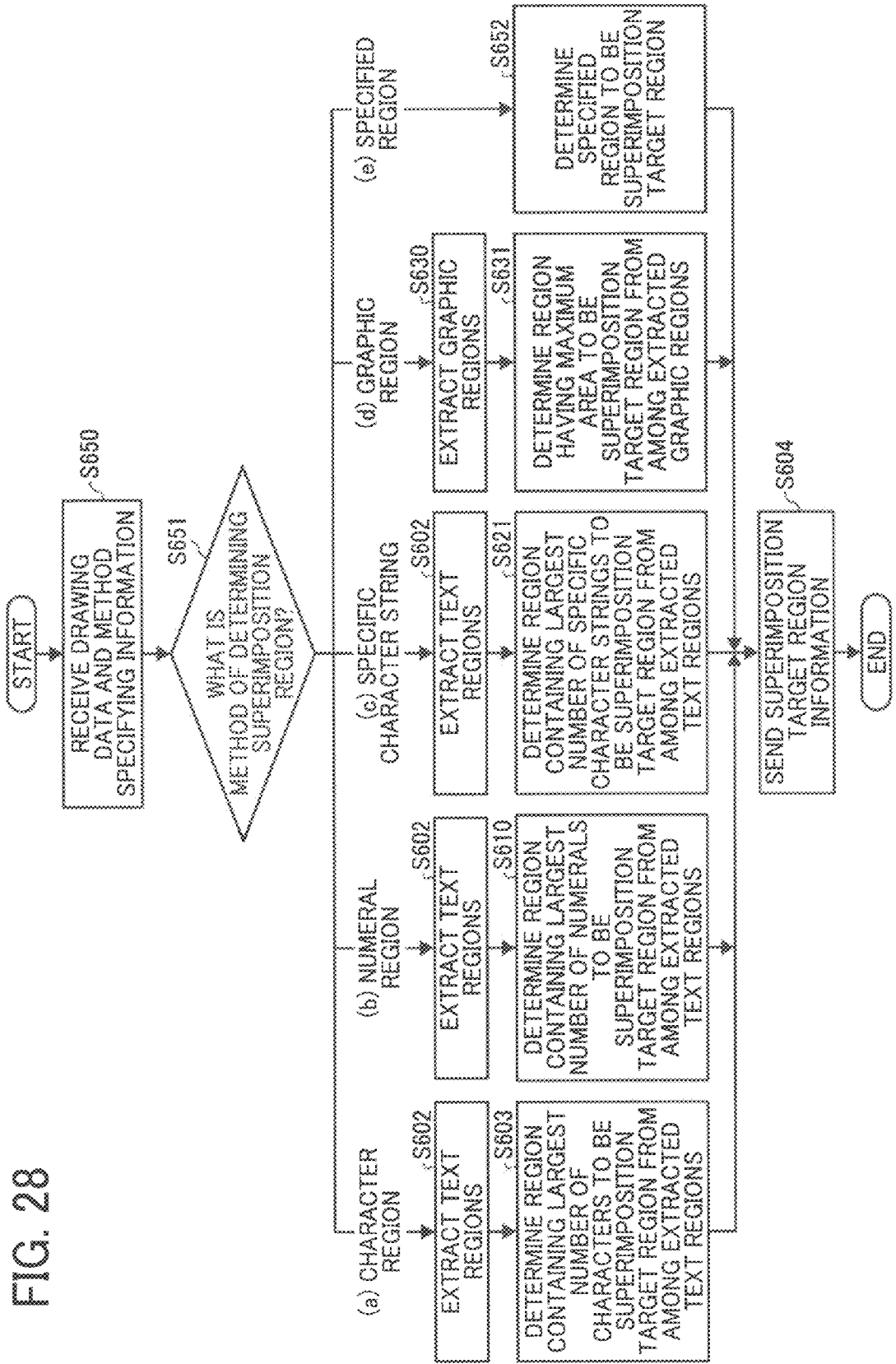
FIG. 28 is a flowchart illustrating a detailed procedure of a process of determining a superimposition target region by a barcode-embedding processing unit according to the seventh embodiment.

A detailed procedure of the process of determining the superimposition target region by the barcode-embedding processing unit 450 at Step S10 is different from that of the second embodiment described above. FIG. 28 is a flowchart illustrating a detailed procedure of the process of determining the superimposition target region by the barcode-embedding processing unit 450 at Step S10 according to the seventh embodiment. The superimposition-target-region determining unit 452 receives the drawing data, the method specification information, and the superimposition target information in some cases, which are sent by the printer driver 430 (Step S650), and determines the method indicated by the received method specification information (Step S651). When the method for (a) described above is selected, the superimposition-target-region determining unit 452 performs the processes at Steps S602 to S604 described with reference to FIG. 19. When the method for (b) described above is selected, the superimposition-target-region determining unit 452 performs the processes at Steps S602, S610, and S604 described with reference to FIG. 21. When the method for (c) described above is selected, the superimposition-target-region determining unit 452 performs the processes at Steps S602, S621, and S604 described with reference to FIG. 23. When the method for (d) described above is selected, the superimposition-target-region determining unit 452 performs the processes at Steps S630, S631, and S604 described with reference to FIG. 24. When the method for (e) described above is selected, because the superimposition-target-region determining unit 452 has received the superimposition target region information at Step S650, the superimposition-target-region determining unit 452 determines a region indicated by the superimposition target region information to be the superimposition target region (Step S652), and performs the process at Step S604. After completion of the process at Step S10 as described above, the processes at Steps S5 to S8 are performed, so that the document image, which is obtained by superimposing the translucent image of the barcode that has been generated at Step S4 onto the superimposition target region determined by the specified method in the electronic document generated at Step S1, is printed onto a print media.

With the above configuration, a user is allowed to arbitrarily select the method of determining the superimposition target region according to a document, so that it is possible to improve convenience for the user.

Next, an image processing apparatus, an image processing method, and a computer readable storage medium having stored therein an image processing program according to an eighth embodiment of the present invention are explained. Components and processes identical to those of the first to the seventh embodiments described above are denoted by identical symbols, and explanation thereof will be omitted appropriately.

In the first to the seventh embodiments described above, one barcode image is superimposed onto a document image by the barcode superimposing unit 453. However, in the eighth embodiment, a plurality of barcode images is superimposed. The number of barcode images may be specified by a user via the print setting dialogue, may be set to a predetermined number, or may be limited to a maximum number that can be arranged depending on a size of the superimposition target region.

Figure 7:
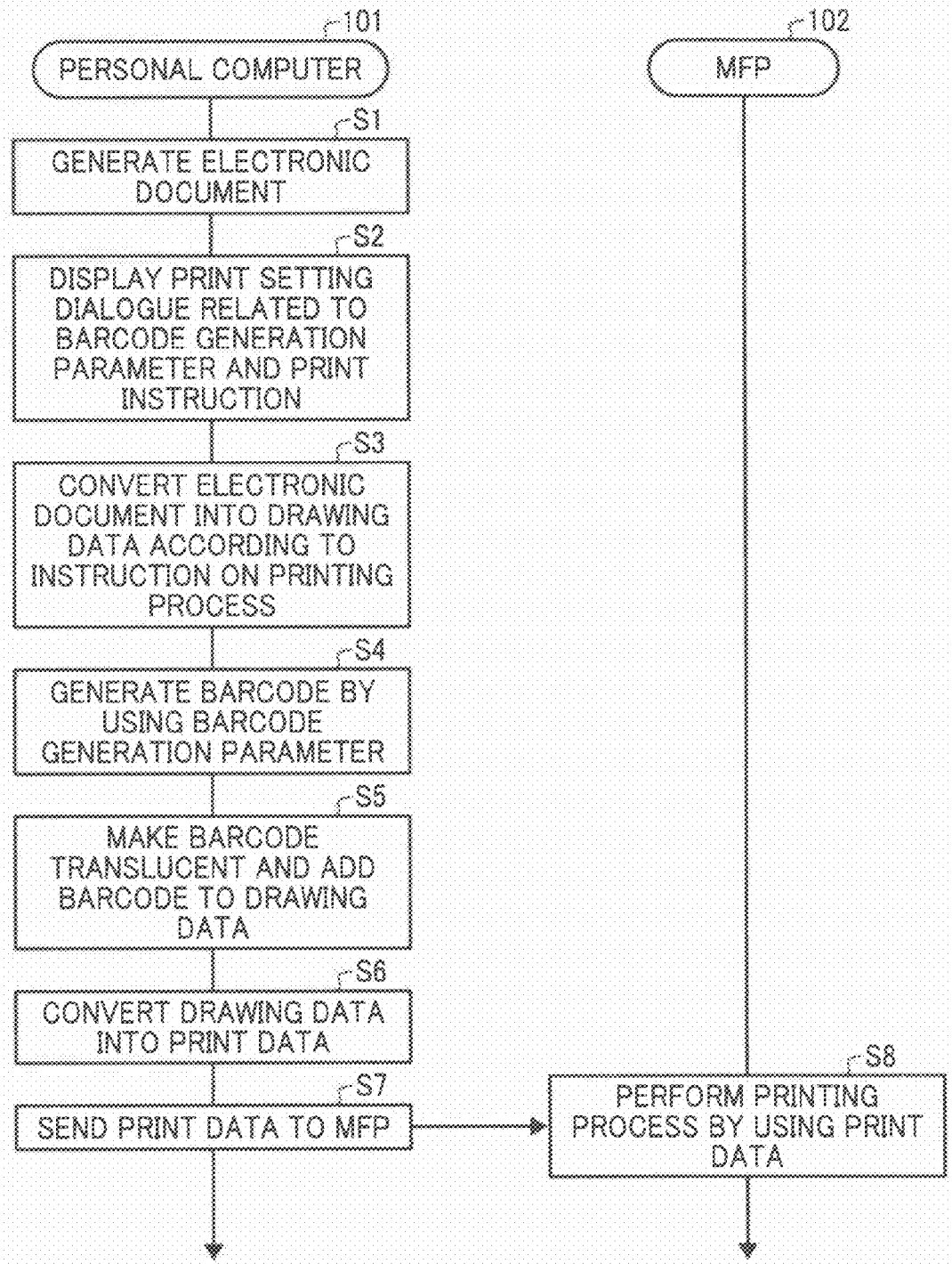
FIG. 7 is a flowchart illustrating a procedure of a printing process performed by the image processing system according to the first embodiment.
Figure 12:
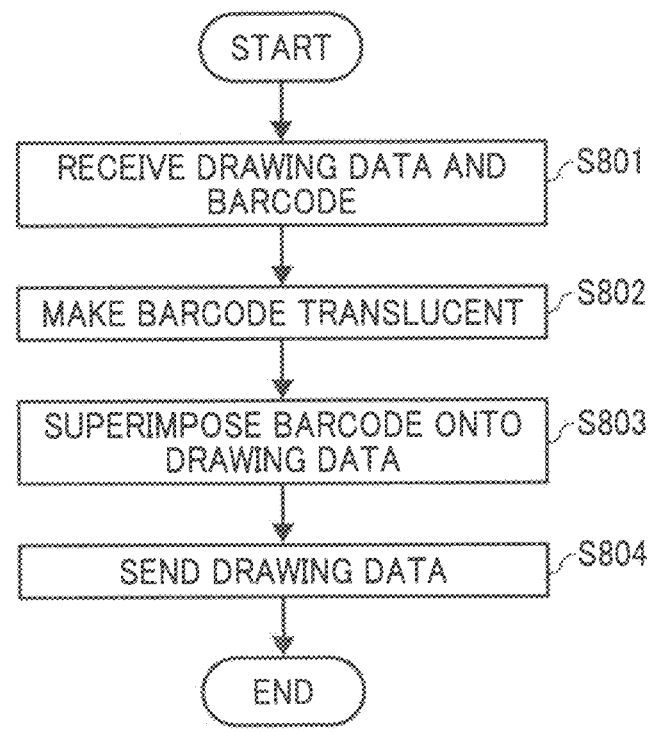
FIG. 12 is a flowchart illustrating a detailed procedure of a process of superimposing a barcode onto an image by the barcode-embedding processing unit.

More specifically, for example, in the first embodiment, at Step S802 of FIG. 12 that illustrates the detailed process procedure at Step S5 of FIG. 7, the barcode superimposing unit 453 of the barcode-embedding processing unit 450 makes a plurality of copies of the barcode received at Step S801, and makes each of the plurality of barcode images translucent (Step S802). At Step S803, the barcode superimposing unit 453 superimposes the plurality of barcode images that has been made translucent at Step S802 onto the image (document image) of the drawing data received at Step S801 one next to the other, so that drawing data to which barcodes are added is generated. At Step S804, the barcode superimposing unit 453 returns the drawing data to the printer driver 430. After completion of the process at Step S5, the processes at Steps S6 to S8 are performed such that the document image, which is obtained by superimposing the plurality of translucent images of the barcode that has been generated at Step S4 onto the electronic document generated at Step S1, is printed on a print medium.

In the second to the seventh embodiments described above, the barcode superimposing unit 453 superimposes the plurality of translucent barcode images one next to the other onto the superimposition target region determined by the superimposition-target-region determining unit 452 in the image (document image) of the drawing data received from the printer driver 430, so that the drawing data to which the barcodes are added is generated.

Figure 29:
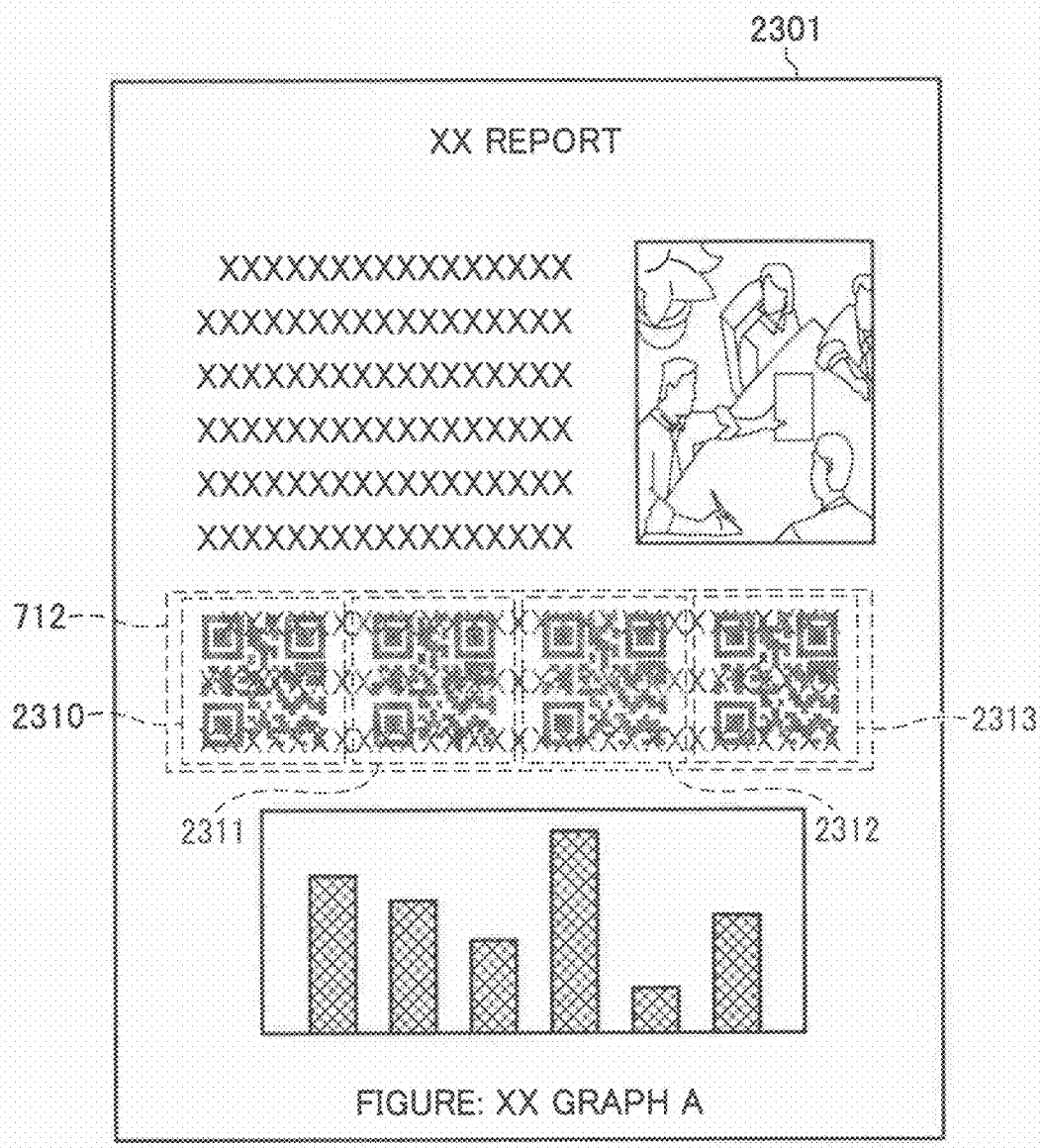
FIG. 29 is a diagram illustrating a document image onto which a plurality of barcodes is superimposed by a barcode superimposing unit according to an eighth embodiment.

FIG. 29 is a diagram illustrating a document image onto which a plurality of barcode images is superimposed by the barcode superimposing unit 453 at Step S803. In a document image 2301 illustrated in FIG. 29, images 2310 to 2313 being QR codes as a plurality of barcodes that have been made translucent are superimposed onto the text region 712 one next to the other. In FIG. 29, the maximum number of barcode images that can be arranged are superimposed according to the size of the text region 712.

With the above configuration, because it is sufficient if at least one of the plurality of barcode images is recognizable, a success rate of the recognition of the barcode image by the barcode reading unit 1240 can be improved.

Next, an image processing apparatus, an image processing method, and a computer readable storage medium having stored therein an image processing program according to a ninth embodiment of the present invention are explained. Components and processes identical to those of the first to the eighth embodiments described above are denoted by identical symbols, and explanation thereof will be omitted appropriately.

In the ninth embodiment, the barcode reading unit 1240 of the personal computer 101 performs a process of removing noise on the image of the image data (referred to as a noise removal process) when performing binarization after normalizing the image data received from the application 1230.

Figure 30:
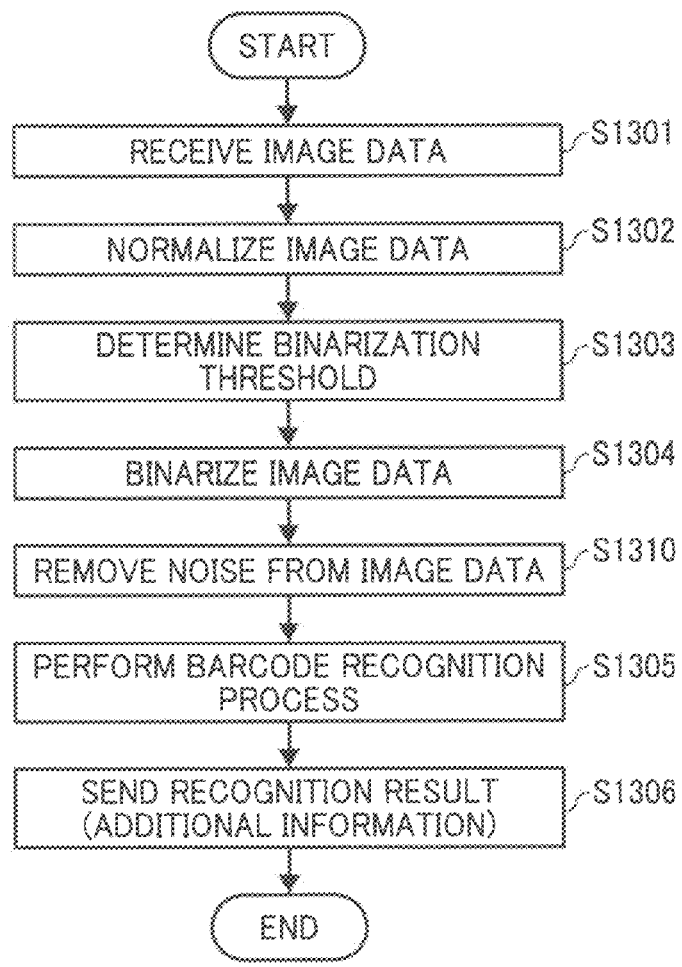
FIG. 30 is a flowchart illustrating a detailed procedure of a process performed by a barcode reading unit according to a ninth embodiment.

Next, a procedure of a process of reading a barcode image from a print medium on which the image with the superimposed barcode image as described above is printed is explained. The procedure of the process itself is substantially the same as that of FIG. 7 or FIG. 18, and therefore, explanation thereof is omitted. In the ninth embodiment, a detailed procedure of the process performed by the barcode reading unit 1240 at Step S22 is different from that of the first embodiment described above. FIG. 30 is a flowchart illustrating a detailed procedure of the process performed by the barcode reading unit 1240 at Step S22 according to the ninth embodiment. Steps S1301 to S1304 are identical to those of the first embodiment. At Step S1310, the barcode reading unit 1240 performs the noise removal process on the image data binarized at Step S1304. The noise removal process is a process of removing, from an image, noise that occurs on a translucent portion due to a pseudo grayscale process such as a dither process during the printing process performed on the image data.

Figure 31:
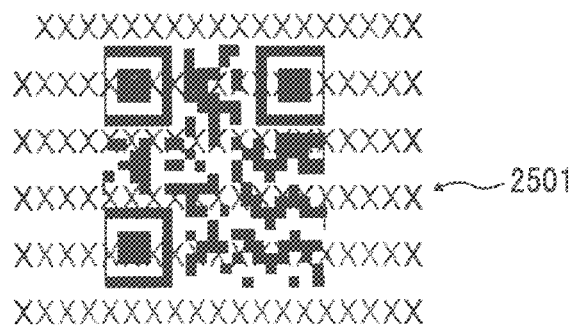
FIG. 31 is a diagram illustrating a state of a translucent barcode portion extracted from an image that is obtained by printing the document image illustrated in FIG. 10 by an image printing unit.
Figure 32:
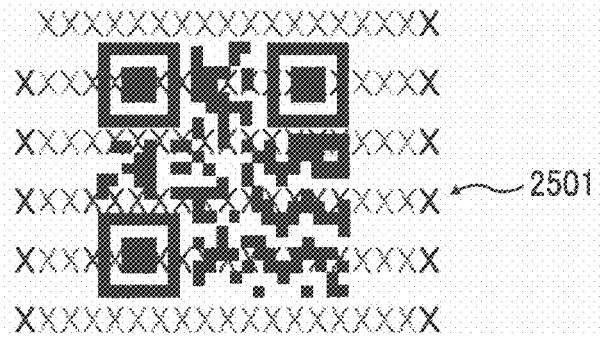
FIG. 32 is a diagram illustrating a state of a barcode portion that is binarized and not subjected to a noise removal process.

FIG. 31 is a diagram illustrating a state of a portion containing a translucent barcode image (referred to as a barcode portion), which is extracted from an image that is obtained by printing the document image 1001 illustrated in FIG. 10 by the image printing unit 460. In a general printer, a pseudo grayscale process, such as a dither process, as one of printing processes is performed on a portion in a halftone color (referred to as a halftone portion). Therefore, a color of the halftone portion does not have a uniform brightness value, and the halftone portion is formed of an image pattern in which black pixels and white pixels are alternately and finely arranged. When the barcode reading unit 1240 recognizes a translucent barcode image in a barcode portion 2501 subjected to the pseudo grayscale process, a color of the translucent portion may not be a halftone color with uniform brightness values and may vary depending on parameters such as resolution. In such a case, as illustrated in FIG. 32, a document image in the portion overlapping the white background portion of the barcode image may not completely be deleted by the binarization process. In other words, in some cases, noise remains on the image. If the barcode image is to be recognized in the image with the remaining noise, the barcode image may not be recognized accurately and a success rate of the recognition may be decreased. As the noise removal process for removing such noise on the image, median filter for example is used.

Figure 33:
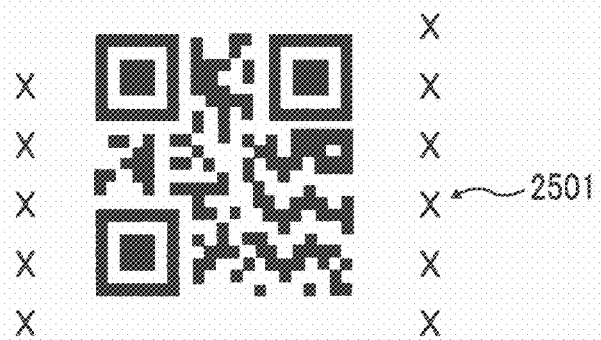
FIG. 33 is a diagram illustrating an exemplary state of the barcode portion that is binarized and subjected to the noise removal process.

The median filter is a filter for outputting a median value of pixel values in a localized region (referred to as a local region) of n×n pixels surrounding a certain pixel of interest, and that is able to remove noise around the pixel of interest (generally referred to as salt-and-pepper noise) without blurring edges. In case of the binarized image data, the number of white pixels and the number of black pixels in the local region of n×n pixels surrounding the pixel of interest are counted, and a pixel value of the pixel of interest is replaced with a pixel value of one superior in number to the other between the white pixel and the black pixel. Therefore, when, at Step S1310, the barcode reading unit 1240 performs such a noise removal process on the image data binarized at Step S1304, noise is removed from the barcode portion 2501 illustrated in FIG. 32, and an image as illustrated in FIG. 33 is obtained. In FIG. 33, the document image in the portion overlapping the white background portion of the barcode image is removed, and white spots on the black background portion of the barcode image are also removed. Because the barcode is sufficiently large compared to the size of characters and numerals in the document image, a module of the barcode is not removed by the noise removal process. Furthermore, because the noise removal process is performed on binarized data, the noise removal process can be performed at high speed.

Steps S1305 and S1306 subsequent to Step S1310 are identical to those of the first embodiment.

With the above configuration, it is possible to remove noise that may occur on the image on a translucent portion due to the pseudo grayscale process such as the dither process during the printing process. Therefore, it is possible to further improve the accuracy of the recognition of the barcode image performed by the barcode reading unit 1240.

Next, an image processing apparatus, an image processing method, and a computer readable storage medium having stored therein an image processing program according to a tenth embodiment of the present invention are explained. Components and processes identical to those of the first to the ninth embodiments described above are denoted by identical symbols, and explanation thereof will be omitted appropriately.

In the tenth embodiment, the barcode generating unit 451 of the barcode-embedding processing unit 450 encrypts the additional information contained in the barcode generation parameter and performs encoding to a barcode by using the encrypted additional information to thereby generate the barcode. On the other hand, the barcode reading unit 1240 recognizes an image of the barcode added to the image data received from the application 1230 and decodes the barcode to thereby acquire the additional information that has been converted into the barcode and embedded into the image. Then, the barcode reading unit 1240 decrypts the additional information and returns the decrypted additional information as a recognition result to the application 1230.

Figure 34:
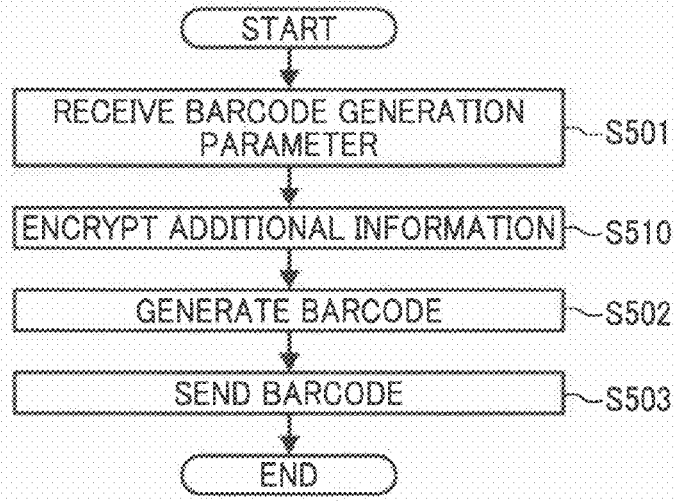
FIG. 34 is a flowchart illustrating a detailed procedure of a process of generating a barcode by a barcode generating unit according to a tenth embodiment.

Next, a procedure of a printing process performed by the image processing system according to the tenth embodiment is explained. The procedure of the printing process itself is substantially the same as that of FIG. 7 or FIG. 18, and therefore, explanation thereof is omitted. In the tenth embodiment, a detailed procedure of the process of generating the barcode by the barcode-embedding processing unit 450 at Step S4 is different from that of each embodiment described above. FIG. 34 is a flowchart illustrating a detailed procedure of the process of generating the barcode by the barcode generating unit 451 of the barcode-embedding processing unit 450 at Step S4 according to the tenth embodiment. Step S501 is identical to that of the first embodiment described above. At Step S510, the barcode generating unit 451 encrypts the additional information contained in the barcode generation parameter received at Step S510. As for the method of encrypting the additional information, various techniques have been known, and any of them can be applied to the tenth embodiment. At Step S502, the barcode generating unit 451 performs encoding of the barcode type contained in the barcode generation parameter received at Step S501 by using the additional information encrypted at Step S510 to thereby generate a barcode. Step S503 is identical to that of the first embodiment described above.

Figure 35:
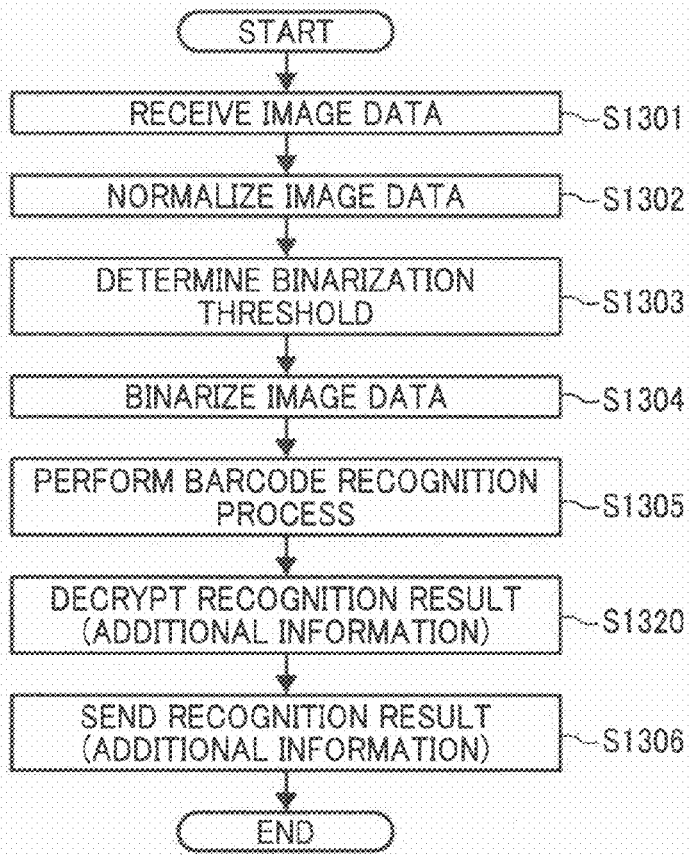
FIG. 35 is a flowchart illustrating a detailed procedure of a process performed by a barcode reading unit according to the tenth embodiment.

Described below is a procedure of a process of reading a barcode image from a print medium on which the image with the superimposed barcode image as describe above is printed. The procedure of the process itself is substantially the same as that of FIG. 14, and therefore, explanation thereof is omitted. In the tenth embodiment, a detailed procedure of the process performed by the barcode reading unit 1240 at Step S22 is different from that of each embodiment described above. FIG. 35 is a flowchart illustrating a detailed procedure of the process performed by the barcode reading unit 1240 at Step S22 according to the tenth embodiment. Steps S1301 to S1305 are identical to those of the first embodiment described above. At Step S1320, the barcode reading unit 1240 decrypts the additional information acquired at Step S1305. The method of decrypting the additional information is corresponding to the method of encrypting the additional information described above. At Step S1306, the barcode reading unit 1240 returns the additional information decrypted at Step S1320 as the recognition result to the application 1230.

With the above configuration, even when a barcode image on a printed document for example is read by a mobile phone and the like, it is difficult to decrypt the encrypted additional information itself. Therefore, it is possible to protect the additional information, so that the security can be enhanced.

Next, an image processing apparatus, an image processing method, and a computer readable storage medium having stored therein an image processing program according to an eleventh embodiment of the present invention are explained. Components and processes identical to those of the first to the tenth embodiments described above are denoted by identical symbols, and explanation thereof will be omitted appropriately.

In the eleventh embodiment, the barcode generating unit 451 sends the generated barcode and the barcode generation parameter used for generating the barcode to the barcode superimposing unit 453. The barcode superimposing unit 453 receives the drawing data, the barcode, the barcode generation parameter, and the superimposition target region information. Then, when superimposing the barcode image onto the superimposition target region indicated by the superimposition target region information in the image of the drawing data, the barcode superimposing unit 453 determines a size of the barcode to be superimposed based on the size of characters appearing on the superimposition target region. Then, the barcode superimposing unit 453 generates drawing data to which the barcode in a determined size is added, and sends the drawing data to the printer driver 430.

Next, a procedure of a printing process performed by the image processing system according to the eleventh embodiment is explained. The procedure of the printing process itself is substantially the same as that of FIG. 18, and therefore, explanation thereof is omitted. However, in the detailed procedure at Step S4, a procedure of the process performed by the barcode generating unit 451 of the barcode-embedding processing unit 450 is partly different from that of FIG. 11. Although not illustrated, the barcode generating unit 451 sends the barcode and the barcode generation parameter used for generating the barcode to the barcode superimposing unit 453 after the process at Step S502.

Figure 36:
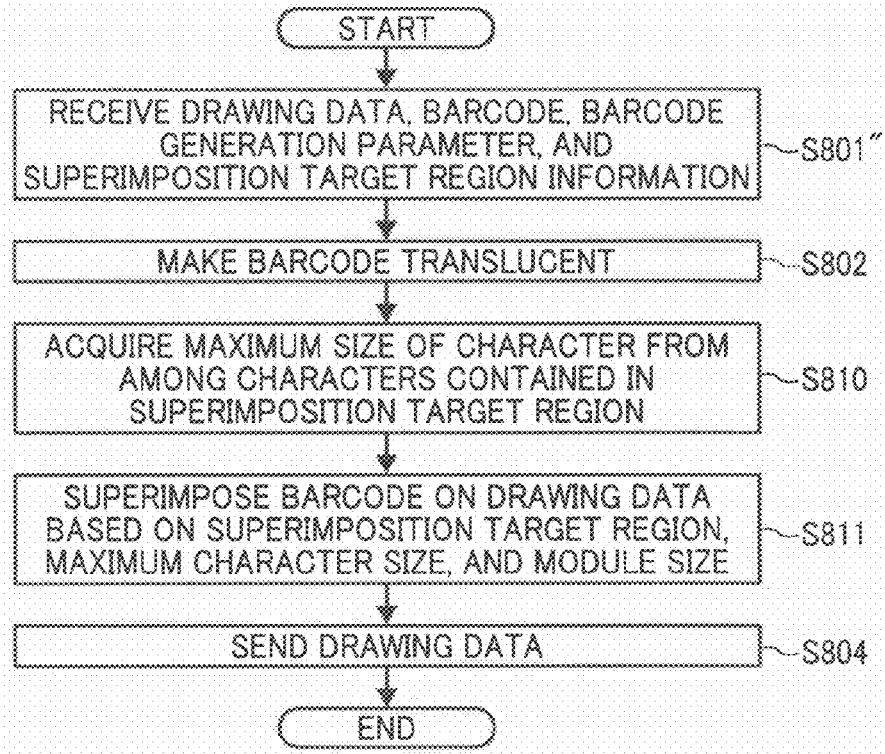
FIG. 36 is a flowchart illustrating a detailed procedure of a process of superimposing a barcode onto an image by a barcode-embedding processing unit according to an eleventh embodiment.

Furthermore, in the eleventh embodiment, a detailed procedure of the process of superimposing the barcode onto the image by the barcode-embedding processing unit 450 at Step S5 is different from that of the second embodiment described above. FIG. 36 is a flowchart illustrating a detailed procedure of the process of superimposing the barcode onto the image by the barcode-embedding processing unit 450 at Step S5. At Step S801", the barcode superimposing unit 453 of the barcode-embedding processing unit 450 receives the barcode generated at Step S4, the barcode generation parameter used for generating the barcode, the drawing data sent by the printer driver 430, and the superimposition target region information indicating the superimposition target region determined at Step S10, i.e., the superimposition target region information sent by the superimposition-target-region determining unit 452 at Step S604 of FIG. 19, and then makes a barcode image translucent (Step S802). At Step S810, the barcode superimposing unit 453 refers to the accompanying data corresponding to the drawing command for a "character string" in the drawing data as illustrated in FIGS. 5A and 5B and acquires the maximum size (referred to as a maximum character size) in the superimposition target region indicated by the superimposition target region information received at Step S801", from among sizes contained in a "character string" contained in each accompanying data.

At Step S811, the barcode superimposing unit 453 determines a size of a barcode image to be superimposed by using the maximum character size acquired at Step S810 and the barcode generation parameter received at Step S801", and appropriately converts the size of the barcode image that is made translucent at Step S802 to the determined size. More specifically, the barcode superimposing unit 453 determines a conversion rate of a module size so that the module size becomes larger than the maximum character size, and converts the size of the barcode image at the conversion rate. Then, the barcode superimposing unit 453 superimposes the barcode image whose size is appropriately converted onto the superimposition target region indicated by the superimposition target region information received at Step S801" in the image (document image) of the drawing data received at Step S801", so that drawing data to which the barcode is added is generated. Step S804 is identical to that of the first embodiment.

Figure 37:
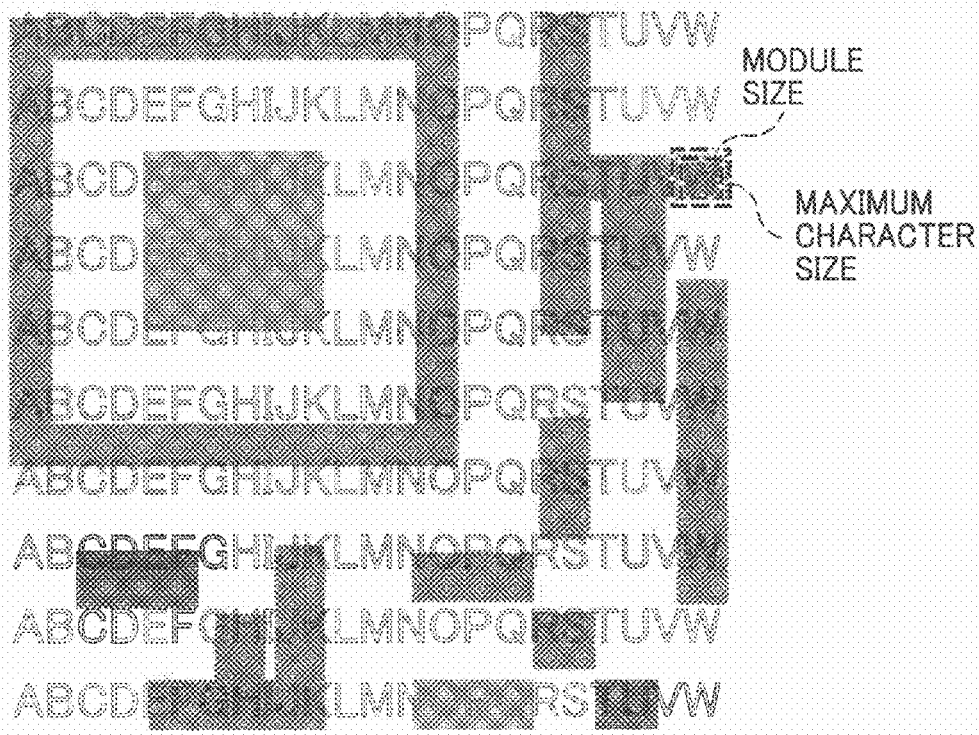
FIG. 37 is a diagram illustrating an example of a barcode that is made translucent and superimposed onto a document image according to the eleventh embodiment.

FIG. 37 is a diagram illustrating an example of a barcode image that is made translucent and superimposed onto a document image according to the eleventh embodiment. As illustrated in FIG. 37, the barcode image that has been made translucent is superimposed onto the document image such that the module size becomes larger than the maximum character size.

With the above configuration, a module of the barcode is made larger than a character. Therefore, influence of noise on the image at the time of recognition of the barcode image is relatively reduced, so that the barcode image can more easily be recognized. Furthermore, because the barcode is sufficiently large compared to the characters, a user can easily read contents of the document image.

The present invention is not limited to the embodiments described above. The present invention may be implemented by modifying the constituent elements without departing from the scope of the present invention. Furthermore, various inventions may be made by appropriate combination of a plurality of the constituent elements disclosed in the embodiments described above. For example, it is possible to omit some constituent elements from among all the constituent elements described in the embodiments. Moreover, it is possible to combine, as necessary, constituent elements from mutually different embodiments. Furthermore, it is acceptable to apply various types of modifications as described below.

In each embodiment described above, various computer programs to be executed by the personal computer 101 may be stored in a computer connected to a network such as the Internet so as to be provided through downloading via the network. Furthermore, the various computer programs may be stored in a computer-readable recording medium such as a CD-ROM, a flexible disk (FD), a CD-R, and a DVD (Digital Versatile Disk), in a file format installable and executable on the computer so as to be provided in a form of a computer readable storage medium, or as a computer program product.

Furthermore, in the image processing system of each embodiment described above, the personal computer 101 may be connected to a printer that can print an electronic document generated by the application 410 and one of a copying machine and a scanner that reads an image appearing on a set print medium and that generates image data of the image, instead of use of the MFP 102.

Moreover, in each embodiment described above, it is explained that the personal computer 101 is equipped with a function of controlling operations and printing of document data and the like and a function of controlling reading of a barcode; however, the present invention is not limited to this example. The personal computer 101 may be equipped with one of these functions. In this case, it is sufficient that the image processing system includes personal computers having the respective functions.

Furthermore, in each embodiment described above, functions that the barcode-embedding processing unit 450 has for making a barcode image translucent and superimposing the barcode image onto a document image may be implemented by the printer driver 430. For example, it is possible for a client program or a server program to implement functions of reading a PDF file or a general image file together with the barcode generation parameter, embedding a translucent barcode image into the image represented by the file, and outputting the image. Moreover, the MFP 102 may be equipped with functions of making the barcode image translucent and superimposing the barcode image onto a document image. Furthermore, these functions may be provided by one application used in a printing process performed by the MFP 102.

Furthermore, the MFP 102 may be equipped with the function of the barcode reading unit 1240 for recognizing the translucent barcode image, instead of the personal computer 101. This function may be provided as one of functions of scan application implementing a function of reading an image by the MFP 102. Moreover, an external server may be equipped with this function as one of functions of a backend service related to the recognition of the barcode image.

In each embodiment described above, it is explained that the barcode reading unit 1240 normalizes image data before binarizing the image data. However, this process may be omitted as necessary. Furthermore, it is possible to change a binarization threshold in accordance with a minimum brightness value and a maximum brightness value in the image data instead of normalizing the image data.

Furthermore, the above Expressions for calculating the binarization threshold are not limited to those described above. As long as it is possible to delete a document image in the portion overlapping the white background of the barcode image by the binarization at Step S1304, any other methods of determining the binarization threshold are applicable.

In each embodiment described above, it is explained that the drawing data input to the barcode-embedding processing unit 450 is formed in EMF (Enhanced Meta File) format and the like. However, it is possible to input drawing data in a general raster format. In this case, in the second to the eighth embodiments described above, when the superimposition-target-region determining unit 452 determines the superimposition target region, a text region and a graphic region on the image may be extracted by using known techniques such as OCR (Optical Character Recognition) and a graphics recognition.

In each embodiment described above, a barcode is used as a means for embedding additional information into a document image. However, any information carriers for representing a machine-readable image pattern are also applicable. For example, an information carrier such as an original symbol that is originally developed may be applied.

In the second to the eighth embodiments described above, the superimposition-target-region determining unit 452 determines one superimposition target region; however, a plurality of superimposition target regions may be determined. For example, the superimposition-target-region determining unit 452 may determine all graphic regions to be the superimposition target regions.

In the sixth embodiment described above, the method of specifying the superimposition target region is not limited to the example described above. For example, it is possible to display a thumbnail of a document image to be printed and allow a user to graphically specify a region by operation such as dragging of the input device 208 such as a mouse on the thumbnail. In the seventh embodiment, the same is applied to the method of specifying a region when determining a specific region to be the superimposition target region.

In the eighth embodiment described above, a user is allowed to select a method of determining the superimposition target region. However, it is possible to automatically determine the method of determining the superimposition target region by causing the personal computer 101 to analyze the document image into which the additional information is to be embedded and to use the result of the analysis. For example, it is possible to determine the text region containing the largest number of characters to be the superimposition target region when the number of characters is larger than that of images such as diagrams and photographs as a result of analysis of the document image. It is also possible to determine the text region containing the largest number of numerals to be the superimposition target region when the number of numerals is larger than that of characters. It is also possible to determine the graphic region having an image that contains at least one of a diagram and a photograph and that has the maximum area to be the superimposition target region when the number of images such as diagrams and photographs is larger than that of characters.

In the ninth embodiment described above, the noise removal process is performed after the binarization of the image data. However, the noise removal process may be preformed before the binarization of the image data. Furthermore, although a median filter is used in the noise removal process, other noise removal processes may be applied as long as the document image overlapping the white background portion of the barcode image can be deleted.

In the eleventh embodiment described above, the barcode superimposing unit 453 appropriately converts the size of the barcode image after the barcode generating unit 451 generates the barcode. However, the barcode generating unit 451 may acquire the superimposition target region information, determine the size of the barcode image similarly to the barcode superimposing unit 453, generate a barcode in the determined size, and send the barcode to the barcode superimposing unit 453. In this case, the barcode superimposing unit 453 superimposes the barcode image sent by the barcode generating unit 451 onto the superimposition target region indicated by the superimposition target region information in the image (document image) of the drawing data, similarly to the second embodiment described above.

Furthermore, in the eleventh embodiment described above, the conversion rate of the module size of barcode is determined by using the maximum character size. However, it is possible to determine the module size of the barcode by using a minimum size of a character appearing on the superimposition target image or an average size of characters appearing on the superimposition target image instead of the maximum character size.

According to one aspect of the present invention, it is possible to reliably embed various information such as confidential information and mechanically read the various information regardless of a type of a document. Furthermore, it is possible to prevent invalidation of the embedded information and ensure the security.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    a generating unit that generates an image carrier representing a machine-readable image pattern by using information to be embedded into a first image; and
    a superimposing unit that makes a second image translucent, the second image being an image of the image carrier, and superimposes the second image onto the first image in such a manner that the second image can be mechanically read and the first image can be read by a user,
    wherein the second image contains at least a first color and a second color, and
    the superimposing unit makes the first color and the second color of the second image translucent at different transparencies, and then superimposes the second image onto the first image.

2. The image processing apparatus according to claim 1, further comprising:
    a superimposition-target-region determining unit that determines a superimposition target region, which is a region in the first image and onto which the second image is to be superimposed, wherein
    the superimposing unit makes the second image translucent, and superimposes the second image onto the superimposition target region in the first image.

3. The image processing apparatus according to claim 2, wherein the superimposition-target-region determining unit determines, in the first image, at least one of a first region containing largest number of characters, a second region containing largest number of numerals, a third region containing largest number of specific character strings, a fourth region having an image that contains at least one of a diagram and a photograph and that has a maximum area, and a fifth region specified by a user, to be the superimposition target region.

4. The image processing apparatus according to claim 3, further comprising:
    an operation-input receiving unit that receives input of an operation of specifying what region is to be the superimposition target region from among the first to the fifth regions, wherein
    the superimposition-target-region determining unit determines the superimposition target region according to the input of the operation.

5. The image processing apparatus according to claim 2, wherein the superimposing unit superimposes a plurality of identical second images onto the superimposition target region one next to the other.

6. The image processing apparatus according to claim 1, wherein
    the second image contains at least one black background portion formed of a black pixel representing black as the first color and at least one white background portion formed of a white pixel representing white as the second color, and
    the superimposing unit makes the black background portion and the white background portion of the second image translucent at different transparencies, and then superimposes the second image onto the first image.

7. The image processing apparatus according to claim 6, wherein the superimposing unit makes the second image translucent at a transparency set such that a color of the first image in a portion overlapping the white background portion becomes lighter than a color of the black background portion, and then superimposes the second image onto the first image.

8. The image processing apparatus according to claim 2, wherein the superimposing unit superimposes the second image in a maximum size that can be superimposed within the superimposition target region.

9. The image processing apparatus according to claim 1, further comprising:
    an encrypting unit that encrypts the information, wherein
    the generating unit generates the image carrier by using encrypted information.

10. The image processing apparatus according to claim 1, further comprising an image printing unit that prints an image on a print medium by using the first image onto which the second image is superimposed.

11. The image processing apparatus according to claim 1, further comprising:
    an image acquiring unit that acquires image data of the first image onto which the second image is superimposed, the second image being an image of the image carrier representing the machine-readable image pattern and being made translucent, and
    a reading unit that mechanically reads the second image by using acquired image data, and acquires information embedded in the first image, wherein
    the second image contains at least one black background portion formed of a black pixel representing black as the first color and at least one white background portion formed of a white pixel representing white as the second color, the black background portion and the white background portion being set to have different transparencies, and
    the reading unit includes
        a binarizing unit that calculates a binarization threshold by using the transparencies of the black background portion and the white background portion of the second image, and binarizes the image data by using the binarization threshold; and
        an image acquiring unit that mechanically reads the second image by using binarized image data to thereby acquire the information.

12. The image processing apparatus according to claim 11, wherein
    the reading unit further includes a noise removing unit that removes noise from an image of the binarized image data, and
    the information acquiring unit mechanically reads the second image by using the image data from which the noise is removed to thereby acquire the information.

13. The image processing apparatus according to claim 11, wherein
    the information is encrypted, and
    the image processing apparatus further comprising:
        a decrypting unit that decrypts encrypted information.

14. The image processing apparatus according to claim 11, further comprising:
    an image reading unit that reads the first image from a print medium on which the first image is printed, and generates image data of the first image, wherein
    the image acquiring unit acquires the image data generated by the image reading unit.

15. An image processing method implemented by an image processing apparatus including a generating unit and a superimposing unit, the image processing method comprising:

generating, by the generating unit, an image carrier representing a machine-readable image pattern by using information to be embedded into a first image;

making, by the superimposing unit, a second image being an image of the image carrier translucent; and superimposing, by the superimposing unit, the second image being made translucent onto the first image in such a manner that the second image can be mechanically read and the first image can be read by a user, wherein the second image contains at least a first color and a second color, and the superimposing unit makes the first color and the second color of the second image translucent at different transparencies, and then superimposes the second image onto the first image.

16. The image processing method according to claim 15, wherein the image processing apparatus further includes an image acquiring unit and a reading unit, and the image processing method further comprising:

acquiring, by the image acquiring unit, image data of the first image onto which the second image is superimposed, the second image being an image of the image carrier representing the machine-readable image pattern and being made translucent; and mechanically reading, by the reading unit, the second image by using the image data acquired at the acquiring to thereby acquire information embedded in the first image, wherein the second image contains at least one black background portion formed of a black pixel representing black as the first color and at least one white background portion formed of a white pixel representing white as the second color, the black background portion and the white background portion being set to have different transparencies, and the mechanically reading further includes calculating a binarization threshold by using the transparencies of the black background portion and the white background portion of the second image;

binarizing the image data by using the binarization threshold; and mechanically reading the second image by using the image data binarized at the binarizing to thereby acquire the information.

17. A non-transitory computer readable storage medium having stored therein an image processing program, the image processing program causing a computer as an image processing apparatus including a generating unit and a superimposing unit to execute a process comprising:

generating, by the generating unit, an image carrier representing a machine-readable image pattern by using information to be embedded into a first image;

making, by the superimposing unit, a second image being an image of the image carrier translucent; and superimposing, by the superimposing unit, the second image being made translucent onto the first image in such a manner that the second image can be mechanically read and the first image can be read by a user, wherein the second image contains at least a first color and a second color, and the superimposing unit makes the first color and the second color of the second image translucent at different transparencies, and then superimposes the second image onto the first image.

* * * * *